United States Patent
Brandt et al.

(10) Patent No.: US 11,481,837 B1
(45) Date of Patent: Oct. 25, 2022

(54) AUTHENTICATION CIRCLE MANAGEMENT

(71) Applicant: Wells Fargo Bank, N.A., San Francisco, CA (US)

(72) Inventors: Balin K. Brandt, Brooklyn, NY (US); Laura Fisher, Rock Hill, SC (US); Marie Jeanette Floyd, Toronto (CA); Katherine J. McGee, San Francisco, CA (US); Teresa Lynn Rench, Mount Holly, NC (US); Sruthi Vangala, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 16/381,689

(22) Filed: Apr. 11, 2019

Related U.S. Application Data

(63) Continuation-in-part of application No. 16/238,299, filed on Jan. 2, 2019.
(Continued)

(51) Int. Cl.
  *G06Q 40/02* (2012.01)
  *H04L 9/40* (2022.01)

(52) U.S. Cl.
  CPC ......... *G06Q 40/02* (2013.01); *H04L 63/0853* (2013.01); *H04L 63/0876* (2013.01); *H04L 63/102* (2013.01)

(58) Field of Classification Search
  CPC .... G06Q 40/02; G06Q 40/00; H04L 63/0853; H04L 63/0876; H04L 63/102
(Continued)

(56) References Cited

U.S. PATENT DOCUMENTS 4,223,403 A   9/1980   Konheim et al.
4,731,842 A   3/1988   Smith
(Continued)

FOREIGN PATENT DOCUMENTS

AU   2015201432 A1   4/2015
WO   WO-01/69830 A2   9/2001
(Continued)

OTHER PUBLICATIONS

DC Software Arts, "Trip Splitter—Track shared expenses and easily even up", http://www.dcsoftwarearts.com/tripsplitter, Apr. 7, 2017; 4 pages.
(Continued)

*Primary Examiner* — Christopher Bridges
*Assistant Examiner* — Timothy T. Hsieh
(74) *Attorney, Agent, or Firm* — Foley & Lardner LLP

(57) ABSTRACT

An approach for establishing and managing authentication circles is disclosed. The circles may be used to facilitate management of accounts, goals, or resources of one or more entities, or to provide an integrated view of the circumstances of, for example, family members or other interrelated persons. A person receiving assistance with the management of one or more accounts need not disclose authentication credentials to persons helping manage the accounts, enhancing security. Members may view members and access accounts administered by separate computing systems without needing credentials for each member, account, and/or computing system. The multiple accounts (which may be held at multiple institutions) need not be accessed individually by each member of the authentication circle, saving time and computing resources of users.

18 Claims, 11 Drawing Sheets

Related U.S. Application Data

(60) Provisional application No. 62/656,753, filed on Apr. 12, 2018, provisional application No. 62/656,750, filed on Apr. 12, 2018, provisional application No. 62/666,587, filed on May 3, 2018, provisional application No. 62/666,591, filed on May 3, 2018.

(58) Field of Classification Search
USPC .................................................. 705/30, 35
See application file for complete search history.

(56) References Cited

U.S. PATENT DOCUMENTS

| | | | |
|---|---|---|---|
| 4,933,971 | A | 6/1990 | Bestock et al. |
| 5,577,121 | A | 11/1996 | Davis et al. |
| 6,466,654 | B1 | 10/2002 | Cooper et al. |
| 7,096,494 | B1 | 8/2006 | Chen |
| 7,315,837 | B2 | 1/2008 | Sloan et al. |
| 7,343,335 | B1 | 3/2008 | Olliphant |
| 7,818,233 | B1 | 10/2010 | Sloan et al. |
| 8,660,849 | B2 | 2/2014 | Gruber et al. |
| 8,880,402 | B2 | 11/2014 | Wasson et al. |
| 8,998,096 | B2 | 4/2015 | Brown |
| 9,098,845 | B2 | 8/2015 | Florek et al. |
| 9,123,038 | B2 | 9/2015 | Cozens et al. |
| 9,213,855 | B1 * | 12/2015 | Corrales ............ G06F 21/6209 |
| 9,218,594 | B2 | 12/2015 | Ramakrishna et al. |
| 9,224,113 | B2 | 12/2015 | Grigg et al. |
| 9,318,108 | B2 | 4/2016 | Gruber et al. |
| 9,477,945 | B2 | 10/2016 | Wu et al. |
| 9,495,331 | B2 | 11/2016 | Govrin et al. |
| 9,519,932 | B2 | 12/2016 | Calman et al. |
| 9,548,050 | B2 | 1/2017 | Gruber et al. |
| 9,973,689 | B2 | 5/2018 | De Bayser et al. |
| 10,027,797 | B1 * | 7/2018 | Hodge ................... H04M 11/04 |
| 10,162,896 | B1 | 12/2018 | Sumter et al. |
| 10,276,170 | B2 | 4/2019 | Gruber et al. |
| 10,291,560 | B2 | 5/2019 | Bern et al. |
| 10,332,047 | B2 | 6/2019 | Wu et al. |
| 10,510,107 | B1 | 12/2019 | Lee et al. |
| 10,573,146 | B1 * | 2/2020 | Jordan, II ................ H04W 4/02 |
| 10,916,251 | B1 | 2/2021 | Brandt et al. |
| 10,943,308 | B1 | 3/2021 | Brandt et al. |
| 10,951,762 | B1 | 3/2021 | Brandt et al. |
| 2005/0097033 | A1 | 5/2005 | Pretell et al. |
| 2005/0156026 | A1 | 7/2005 | Ghosh et al. |
| 2006/0074788 | A1 | 4/2006 | Grizack et al. |
| 2008/0103781 | A1 | 5/2008 | Wasson et al. |
| 2009/0103730 | A1 | 4/2009 | Ward et al. |
| 2009/0119190 | A1 | 5/2009 | Realini |
| 2010/0106498 | A1 | 4/2010 | Morrison |
| 2010/0131413 | A1 | 5/2010 | Kranzley et al. |
| 2010/0169789 | A1 * | 7/2010 | Cheng ................... G06Q 30/00 715/738 |
| 2010/0250421 | A1 | 9/2010 | Ariff et al. |
| 2010/0318576 | A1 | 12/2010 | Kim |
| 2012/0150728 | A1 | 6/2012 | Isaacson et al. |
| 2012/0173464 | A1 | 7/2012 | Tur et al. |
| 2012/0185397 | A1 | 7/2012 | Levovitz |
| 2012/0197794 | A1 | 8/2012 | Grigg et al. |
| 2012/0227094 | A1 | 9/2012 | Begen et al. |
| 2012/0316916 | A1 | 12/2012 | Andrews et al. |
| 2013/0030994 | A1 | 1/2013 | Calman et al. |
| 2013/0054474 | A1 | 2/2013 | Yeager |
| 2013/0085931 | A1 | 4/2013 | Runyan |
| 2013/0091212 | A1 * | 4/2013 | Rajakarunanayake ...................... H04L 67/306 709/204 |
| 2013/0091582 | A1 | 4/2013 | Chen et al. |
| 2013/0159173 | A1 | 6/2013 | Sivaraman et al. |
| 2013/0167196 | A1 | 6/2013 | Spencer et al. |
| 2013/0262290 | A1 | 10/2013 | Hanson |
| 2013/0262294 | A1 | 10/2013 | Green et al. |
| 2013/0262317 | A1 | 10/2013 | Collinge et al. |
| 2013/0339114 | A1 | 12/2013 | Plut |
| 2013/0339234 | A1 | 12/2013 | Prakash et al. |
| 2014/0040129 | A1 | 2/2014 | Akin |
| 2014/0114735 | A1 | 4/2014 | Isaacson et al. |
| 2014/0122592 | A1 | 5/2014 | Houston et al. |
| 2014/0136365 | A1 | 5/2014 | Nista |
| 2014/0156328 | A1 | 6/2014 | Grigg et al. |
| 2014/0244476 | A1 | 8/2014 | Shvarts et al. |
| 2014/0278676 | A1 | 9/2014 | Burka |
| 2014/0331278 | A1 * | 11/2014 | Tkachev ................. H04L 63/08 726/1 |
| 2014/0351118 | A1 | 11/2014 | Zhao |
| 2014/0351130 | A1 | 11/2014 | Cheek et al. |
| 2014/0351328 | A1 | 11/2014 | Woods et al. |
| 2014/0365332 | A1 | 12/2014 | Sutton et al. |
| 2015/0019229 | A1 | 1/2015 | Fish |
| 2015/0073952 | A1 | 3/2015 | Ventura et al. |
| 2015/0073959 | A1 | 3/2015 | Connors et al. |
| 2015/0100482 | A1 | 4/2015 | Zamer et al. |
| 2015/0120345 | A1 | 4/2015 | Rose |
| 2015/0189085 | A1 | 7/2015 | Riahi et al. |
| 2015/0206135 | A1 | 7/2015 | Scipioni et al. |
| 2015/0227941 | A1 | 8/2015 | Tuchman et al. |
| 2015/0242911 | A1 | 8/2015 | Zises |
| 2015/0331666 | A1 | 11/2015 | Bucsa et al. |
| 2016/0012465 | A1 | 1/2016 | Sharp |
| 2016/0019472 | A1 | 1/2016 | Javit |
| 2016/0035353 | A1 | 2/2016 | Chen et al. |
| 2016/0086222 | A1 | 3/2016 | Kurapati |
| 2016/0117651 | A1 | 4/2016 | Davis |
| 2016/0125470 | A1 | 5/2016 | Myers |
| 2016/0180465 | A1 | 6/2016 | Deperro et al. |
| 2016/0197993 | A1 * | 7/2016 | Perkowski .............. H04L 67/02 709/203 |
| 2016/0232546 | A1 | 8/2016 | Ranft et al. |
| 2016/0232719 | A1 | 8/2016 | Brinig et al. |
| 2016/0253702 | A1 | 9/2016 | Gonzales, Jr. |
| 2016/0253710 | A1 | 9/2016 | Publicover et al. |
| 2016/0321582 | A1 | 11/2016 | Broudou et al. |
| 2016/0360382 | A1 | 12/2016 | Gross et al. |
| 2017/0040018 | A1 | 2/2017 | Tormey |
| 2017/0150337 | A1 | 5/2017 | Bareket et al. |
| 2017/0323345 | A1 | 11/2017 | Flowers et al. |
| 2017/0372429 | A1 | 12/2017 | La Placa |
| 2018/0077138 | A1 | 3/2018 | Bansal et al. |
| 2018/0101881 | A1 | 4/2018 | Tian et al. |
| 2018/0182383 | A1 | 6/2018 | Kim et al. |
| 2018/0191695 | A1 * | 7/2018 | Lindemann ......... H04L 63/0853 |
| 2018/0376002 | A1 | 12/2018 | Abraham |
| 2019/0199715 | A1 | 6/2019 | May |
| 2019/0304576 | A1 * | 10/2019 | Mendoza ............... G16H 10/60 |
| 2019/0311791 | A1 | 10/2019 | St. Paul |
| 2020/0007530 | A1 * | 1/2020 | Mohamad Abdul .... H04L 67/26 |

FOREIGN PATENT DOCUMENTS

| | | | |
|---|---|---|---|
| WO | WO-2012/136986 A1 | 10/2012 | |
| WO | WO-2012/136987 A1 | 10/2012 | |

OTHER PUBLICATIONS

Ion et al., "Don't Trust POS Terminals! Verify in-shop payments with your phone", 2010, 10 pages.

Lopez et al., "Advice goes virtual: how new digital investment services are changing the wealth management landscape", Journal of Financial Perspectives 3.3, 2015, 1-21.

Agadakos, et al., "Location-enhanced Authentication using the IOT," in ACSAC, 2016 (Year: 2016).

Bedra et al., "Design Best Practices for an Authentication System," IEEE Cyber Security. Jun. 2, 2016 (Year: 2016).

Susham et.al, in "A Group Policy Based Authentication for Cloud Sharing," (Year: 2016).

\* cited by examiner

AUTHENTICATION CIRCLE MANAGEMENT

CROSS REFERENCE TO RELATED APPLICATION

This application is a continuation-in-part of U.S. patent application Ser. No. 16/238,299 entitled "AUTHENTICATION CIRCLE MANAGEMENT," filed Jan. 2, 2019, which claims priority to U.S. Provisional Patent Application No. 62/656,750 entitled "SYSTEMS AND METHODS FOR AUTHENTICATION CIRCLE MANAGEMENT," filed Apr. 12, 2018, U.S. Provisional Patent Application No. 62/656,753 entitled "SYSTEMS AND METHODS FOR AUTHENTICATION CIRCLE SHARED EXPENSES WITH EXTENDED FAMILY AND FRIENDS," filed Apr. 12, 2018, U.S. Provisional Patent Application No. 62/666,587 entitled "SYSTEMS AND METHODS FOR PROACTIVE LISTENING BOT-PLUS PERSON ADVICE CHAINING," filed May 3, 2018, and U.S. Provisional Patent Application No. 62/666,591 entitled "SYSTEMS AND METHODS FOR PERVASIVE ADVISOR FOR MAJOR EXPENDITURES," filed May 3, 2018, all of which are incorporated herein by reference in their entireties.

BACKGROUND

During certain life events, occasions, or time periods, people have a need to manage the finances of another, provide financial support to each other, and/or give financial gifts to each other. Often times, the finances of individuals are interrelated such as in the case of a grandparent and grandchild, parent and child, or husband and wife. In general, physical mechanisms (e.g., cash or check) or electronic mechanisms (e.g., P2P payment systems) are utilized to provide support to another person. However, in order for a person to manage the financial accounts of another electronically, the person managing the account must receive the account number and/or authentication credentials of the other person for each account to be managed and/or for each financial institution at which accounts are held. Such systems and requirements to manage the accounts of another are not only cumbersome, they also leave account holders vulnerable to fraud and increase the amount of time it takes to provide support.

Moreover, a first person sharing his or her login credentials with a second person managing one of the first person's accounts is not able to prevent what actions can be taken by the second person when the second person is logged in. Consequently, providing credentials is conventionally an all-or-none proposition, such that the second person is either provided with the credentials and allowed to perform all the same functions available to the first person, or the second person is not provided with the credentials in the first place. Additionally, if a user provides his or her authentication credentials to another, that other person could change the login credentials of the user, effectively locking out the user and preventing him or her from accessing information and engaging in time-sensitive transactions (until he or she is able to regain control via the financial institution).

Further, the second person (e.g., a child) with the authentication credentials of the first person (e.g., a parent needing assistance with his or her finances) may only have a narrow view of the finances of the first person, and is not presented with the first person's financial information in the context of, for example: (1) his or her own finances, which may be particularly relevant if, for example, the second person may wish to contribute funds to the financial expenses, goals, and/or resources of the first person; (2) the finances of a third person (such as a spouse or sibling of the second person) with whom the finances of the first and/or second person are interrelated or otherwise relevant; and/or (3) the financial expenses, goals, and/or resources of any of the first person (who may be receiving assistance), second person (who may be assisting the first person), and third person (whose finances may be shared or otherwise relevant).

What are needed are systems and methods that address one or more of the above, as well as other, shortcomings of conventional approaches.

SUMMARY

Various embodiments of the disclosure relate to a method of administering an authentication circle. The method may comprise registering a first user for an authentication circle. The first user may be registered via a first device. The first user may be registered such that the first user is granted access to the authentication circle via a first credential. The method may also comprise registering a second user for the authentication circle. The second user may be registered a second device. The second user may be registered such that the second user is granted access to the authentication circle via a second credential. The method may moreover comprise linking a first account to the authentication circle. The first account may be an account of the first user. The first account may be linked to the authentication circle such that first account data from the first account is retrievable for the authentication circle. The method may additionally comprise accepting a first permission definition. The first permission definition may concern access rights to the first account. The first permission definition may be accepted via the first device. The method may further comprise granting the second user access to the first account. The second user may be granted access to the first account via the second login credential. Access may be granted according to the first permission definition. Prior to being linked to the authentication circle, the first account may have been inaccessible via the second credential.

In various implementations, a second account of the second user may be linked to the authentication circle. The second account may be linked such that second account data from the second account is retrievable for the authentication circle.

In various implementations, a second permission definition may be accepted. The second permission definition may be accepted via the second device. The second permission definition may concern access rights to the second account.

In various implementations, the first user may be granted access to the second account via the first login credential. Access may be granted according to the second permission definition. Prior to being linked to the authentication circle, the second account may have been inaccessible via the first credential of the first user.

In various implementations, a third user may be registered for the authentication circle. The third user may be registered via a third device. The third user may be registered such that the third user is granted access to the authentication circle via a third credential. The third user may be granted access, via the third login credential, to the first and second accounts according to the first and second permission definitions, respectively.

In various implementations, the method may be implemented by a provider computing system administering the authentication circle. The first account may also be administered by the provider computing system.

In various implementations, the first account may be administered by a third-party computing system of a third-party. Linking the first account to the authentication circle may comprise the provider computing system acquiring an access token from the third-party computing system. The access token may be configured to grant the provider computing system access to the first account.

In various implementations, the first permission definition may indicate that all account data is accessible to the second user. The first permission definition may also indicate that only a subset of account data is accessible to the second user. The first permission definition may alternatively or additionally indicate that the second user may make changes to the first account.

Various embodiments of the disclosure relate to a service provider computing system for providing an authentication circle. The system may comprise a network interface configured to communicate, via a telecommunications network, with a plurality of user devices. The system may also comprise one or more processors and memory storing instructions that, when executed by the one or more processors, cause the one or more processors to perform specific functions. The one or more processors may be caused to register a first member for an authentication circle via a first user device of the first member. Registering the first member may comprises accepting first login credentials from the first user device. The first login credentials may grant the first member remote access to the authentication circle. The one or more processors may also be caused to register a second member for the authentication circle via a second user device of the second member. Registering the second member may comprise accepting second login credentials from the second user device. The second login credentials may grant the second member remote access to the authentication circle. The one or more processors may moreover be caused to link a first account of the first member to the authentication circle. Linking the first account may comprise obtaining access to the first account. The one or more processors may additionally be caused to retrieve first account data corresponding to the first account. The one or more processors may further be caused to present, via a dashboard, the first account data to the first user device upon login to the authentication circle using the first credentials. The one or more processors may furthermore be caused to present, via the dashboard, the first account data to the second user device upon login to the authentication circle using the second credentials.

In various implementations, the one or more processors may be caused to obtain access to the first account at least by receiving third login credentials that grant direct access to the first account outside of the authentication circle.

In various implementations, the first account may be administered by the provider computing system. The one or more processors may be caused to link the first account to the authentication circle at least by authenticating the first user and obtaining authorization from the first user to access first account data for the authentication circle.

In various implementations, the first account may be administered by a third-party computing system. The one or more processors may be caused to link the first account to the authentication circle at least by obtaining a security token from the third-party computing system. The security token may be configured to authenticate the provider computing system when the provider computing system accesses the first account data.

In various implementations, the first account may be administered by a third-party computing system. The one or more processors may be caused to retrieve the first account data at least by making an API call to the third-party computing system.

In various implementations, the one or more processors may be caused to include a security token with the API call to the third-party computing system. The security token may be configured to authenticate the provider computing system and/or identify the first account.

In various implementations, the one or more processors may be caused to accept a permission definition defining access rights of the second user to the first account. The permission definition may be accepted from the first device.

In various implementations, the one or more processors may be caused to present the first account data to the first user device according to the first permission definition. The first account data may be presented via a dashboard.

Various embodiments of the disclosure relate to a first user device. The first user device may comprise one or more network interfaces configured to communicate with one or more other devices. The first user device may also comprise one or more user interfaces configured to receive inputs from a first user and/or provide outputs to the first user. The first user device may moreover comprise one or more processors and a memory storing instructions that, when executed by the one or more processors, cause the one or more processors to perform specific functions. The one or more processors may be caused to determine that a second user device of a second user is nearby. The one or more processors may determine that the second user device is nearby via the one or more network interfaces. The one or more processors may also be caused to prompt, via the one or more user interfaces, the first user to inquire as to whether the first user wishes to be a first member of an authentication circle that includes the second user as a second member. The one or more processors may moreover be caused to accept, via the one or more user interfaces, an affirmative response to the inquiry. The one or more processors may additionally be caused to transmit, via the one or more network interfaces, an indication of acceptance. The indication of acceptance may be transmitted to a service provider computing system. The service provider computing system may administer the authentication circle.

In various implementations, the one or more processors may be caused to determine that the second user device is nearby via near-field communication between the first and second user devices.

Various embodiments of the disclosure relate to a service provider computing system. The service provider computing system may allow a first user to access an account of a second user using separate login credentials. The system may comprise a network interface configured to communicate, via a telecommunications network, with a first device of the first user and a second device of the second user. The system may also comprise a processor and memory storing thereon instructions that, when executed by the processor, cause the processor to perform specific functions. The system may be configured to transmit to the first device a first request. The first request may request that the first user form and/or join an authentication circle. The system may additionally or alternatively be configured to transmit a second request to the second device. The second request may request that the second user form and/or join an authentication circle. The system may also be configured to receive a first indication of acceptance of the first request via the first device. The system may additionally or alternatively be configured to receive a second indication of acceptance of the second request via the second device. The system may further be configured to link the account of the second user to the authentication circle. The system may furthermore be configured to generate a dashboard. The dashboard may provide a view identifying the first and/or second users. The dashboard may also provide access to the linked account of the second user. The dashboard may be configured to make the account accessible to the first user. The account may be made accessible without use of login credentials used by the second user to access the account.

In various implementations, the authentication circle may be configured to initiate a transaction implementing a change to the account of the second user. The transaction may be initiated in response to a user input received from the first device. The user input may have been received via the dashboard.

In various implementations, the system may be configured to associate the first and second users with the authentication circle as members of the authentication circle.

In various implementations, the account is a first account. The system may be configured to cause the processor to link a second account of at least one of the first and second users to the authentication circle.

In various implementations, the system may be configured to generate the dashboard so as to provide the first and second users access to the first and second accounts.

In various implementations, the dashboard may be configured to allow for a transaction involving both the first and second accounts.

In various implementations, the authentication circle may define a first role for the first user. The dashboard may be configured to provide users with the first role a first set of functionalities. Additionally or alternatively, the authentication circle may define a second role for the second user. The dashboard may be configured to provide users with the second role a second set of functionalities.

In various implementations, the authentication circle may define a first permission level for the first user. The dashboard may be configured to provide users at the first permission level a first set of account details. Additionally or alternatively, the authentication circle may define a second permission level for the second user. The dashboard may be configured to provide users at the second permission level a second set of account details.

In various implementations, the system is configured to detect a sound signature. The sound signature may have been captured using an ambient sensor of one of the first and second devices. The sound signature may be indicative of an event involving at least one of the first and second users. The system may also be configured to generate a prompt. The prompt may be presented via the dashboard. The prompt may propose adding a second account to the authentication circle. The prompt may alternatively or additionally propose adding a third user to the authentication circle.

In various implementations, the account is administered by the service provider computing system.

In various implementations, the account is administered by a third-party computing system.

Various embodiments of the disclosure relate to a method. The method may allow a first user to access an account of a second user using separate login credentials. The method may comprise transmitting a first request to form and/or join an authentication circle. The first request may be transmitted to the first device. The method may additionally or alternatively comprise transmitting a second request to form and/or join an authentication circle. The second request may be transmitted to the second device. The method may also comprise receiving a first indication of acceptance via the first device. The method may additionally or alternatively comprise receiving a second indication of acceptance via the second device. The method may moreover comprise linking the account of the second user to the authentication circle. The method may additionally comprise generating a dashboard. The dashboard may provide a view identifying the first and second users. The dashboard may also provide access to the linked account of the second user. The dashboard may be configured to make the account accessible to the first user. The account may be made accessible to the first user without use of login credentials used by the second user to access the account.

In various implementations, the method further comprises initiating a transaction implementing a change to the account of the second user. The transaction may be initiated in response to a user input from the first device.

In various implementations, the account is a first account. The method may comprise linking a second account to the authentication circle. The second account may be an account of at least one of the first and second users.

In various implementations, the method comprises generating the dashboard so as to provide the first and second users access to the first and second accounts.

In various implementations, the dashboard is configured to allow for a transaction involving both the first and second accounts.

In various implementations, the authentication circle may define a first role for the first user. The dashboard may be configured to provide users with the first role a first set of functionalities. The authentication circle may additionally or alternatively define a second role for the second user. The dashboard may be configured to provide users with the second role a second set of functionalities.

In various implementations, the authentication circle may define a first permission level for the first user. The dashboard may be configured to provide users at the first permission level a first set of account details. The authentication circle may additionally or alternatively define a second permission level for the second user. The dashboard may be configured to provide users at the second permission level a second set of account details.

In various implementations, the method may comprise detecting a sound signature. The sound signature may have been captured using an ambient sensor of one or both of the first and second devices. The sound signature may be indicative of an event involving at least one of the first and second users. The method may comprise generating a prompt to propose adding at least one of a second account and a third user to the authentication circle. The prompt may be presented via the dashboard.

Various embodiments of the disclosure relate to a non-transitory computer-readable medium. The medium may have stored thereon instructions which, when executed by a processor, cause the processor to perform specific operations. The operations may comprise transmitting a first request to form and/or join an authentication circle. The first request may be transmitted to the first device. The operations may additionally or alternatively comprise transmitting a second request to form and/or join an authentication circle. The second request may be transmitted to the second device. The operations may also comprise receiving a first indication of acceptance via the first device. The operations may additionally or alternatively comprise receiving a second indication of acceptance via the second device. The operations may moreover comprise linking the account of the second user to the authentication circle. The operations may additionally comprise generating a dashboard. The dashboard may provide a view identifying the first and second users. The dashboard may also provide access to the linked account of the second user. The dashboard may be configured to make the account accessible to the first user. The account may be made accessible to the first user without use of login credentials used by the second user to access the account.

Example embodiments relate to systems and methods for providing an authentication circle, for example, to manage a financial account of another person, to set financial goals for one or more members of the authentication circle, and/or to have a more holistic view of the financial circumstances of two or more persons. The system may include a provider computing system (of, e.g., a financial institution or other entity) in communication with one or more user devices. The provider computing system may accept requests to establish or join an authentication circle, the authentication circle structured to facilitate management of financial accounts, goals, or resources of one or more other persons associated with the authentication circle. With one or more members associated with the circle and one or more financial accounts linked to the circle, the computing system may generate an integrated view of a plurality of financial accounts of the members of the authentication circle.

These and other features, together with the organization and manner of operation thereof, will become apparent from the following detailed description when taken in conjunction with the accompanying drawings.

DETAILED DESCRIPTION

Figure 1A:
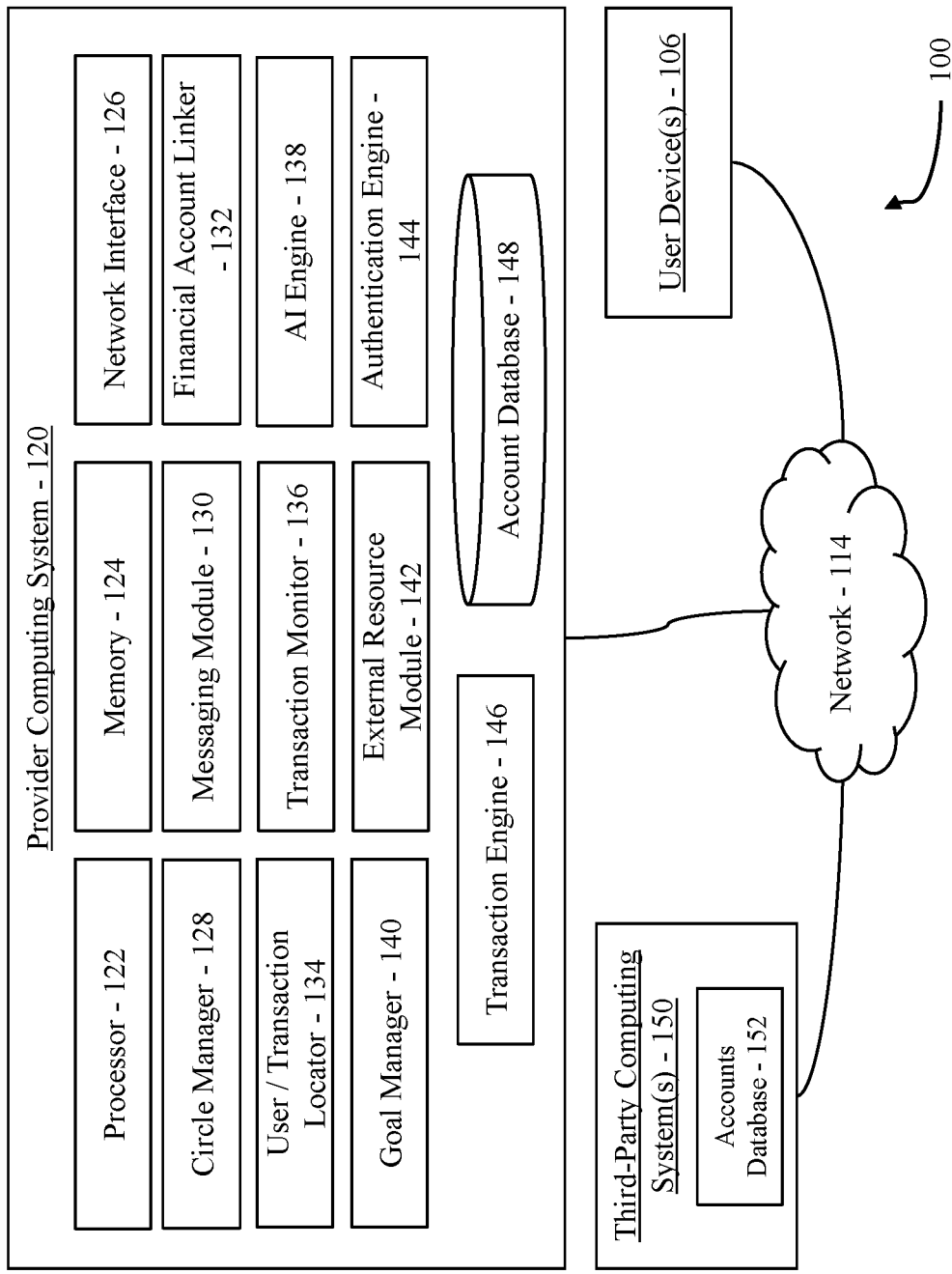
FIG. 1A is a block diagram of a system with a provider computing system, user device(s), and third-party computing system(s), according to one or more example embodiments.

Referring to the figures generally, example systems and methods of managing one or more accounts (financial or otherwise), goals, or resources of one or more other entities are described. In various embodiments, the approach involves one or more user devices interacting with a provider computing system of a service provider. The provider computing system may be communicatively coupled to the user device(s). The provider computing system is structured to administer and manage a limited authentication circle. As used herein, the term "authentication circle" (or, sometimes, simply "circle") may be used to refer to a group comprising two or more members who are connected or otherwise linked such that a first member of the authentication circle may gain access to an account of a second member of the authentication circle without providing authentication credentials of the second member of the authentication circle. For example, the first member may be authenticated to access the account of the second member by providing authentication credentials of the first member, instead of providing authentication credentials of the second member.

The authentication circle may be "limited" in one or more ways. For example, the authentication circle may be limited because the second member retains the ability to revoke or withdraw the right of the first member to access the account of the second member in the future. The first member may additionally or alternatively be limited in how he or she is able to use or interact with the account of the second member. For example, the first member's interaction may be limited because he or she is only provided with view-only access to the financial information associated with the account of the second member, and/or there may be restrictions on what dollar amounts may be transacted (e.g., transferred into or out of the account of the second member), or restricted in another manner.

The provider computing system may be structured to receive (directly or via a client application running on one or more user devices) a request to establish or join a limited authentication circle with one or more other members. A requester (who may submit the request to the provider computing system via a provider client application running on the user device) may identify one or more individuals to be invited to join the authentication circle. Additionally or alternatively, individuals may request to join an existing authentication circle. Each member of the authentication circle may associate one or more accounts (which may be held at the same financial institution or may be held at two or more financial institutions) to be linked or otherwise associated with the authentication circle and made accessible to one or more members of the authentication circle. This may involve the owner (or other authorized person) of the account(s) to link or otherwise associate the account(s) with the authentication circle via the provider computing system and/or via a third-party computing system of an entity administering the account. Linking an account may involve, for example, the account holder providing the provider computing system with account information (e.g., financial institution or other entity administering the account, account number, etc.) and/or authentication credentials (e.g., username and password used to access the account), or otherwise providing the provider computing system with authorization to access account data and/or make changes to the account. Linking may, additionally or alternatively, involve the provider computing system acquiring an access token from a third-party computing system for access to accounts administered by third-parties. The access token may define the authorized activities (e.g., what account data is accessible, what changes may be made to the account, etc.). Once linked, members of the circle can access the account via the provider computing system by submitting their own credentials, without submitting the credentials of the account holder to the provider computing system or the third-party computing system. For each account, the member who is account holder may grant different levels of permissions (e.g., no access, view-only access, deposit-only access, or unrestricted access) to different members. The rights or permissions granted to one or more members may be identified in one or more permission definitions. Permission definitions may be saved, for example, in account database 148.

In some implementations, members and accounts may have one or more different potential classifications and roles. A member who is an "account holder" has linked one or more accounts to the authentication circle. A linked account may be classified as a "primary" account if it is to be manageable (to some extent) by a member (e.g., a "manager") who is not the account holder and who would otherwise not be able to access or transact with the account. An account may be classified a "secondary" account if it is not to be managed by other members, but its balances and/or transactions (e.g., payments and balance transfers) are to be integrated in the circle to make it easier for members (who are granted access to the secondary account) to consider the overall financial circumstances of the interrelated members (e.g., to help in determining whether a financial goal has been reached, or whether funds are available to make up for deficiencies in another account). A member who has linked a primary account (which is to be managed by another member) may be an "assisted" member (i.e., a member who is being assisted with account management by one or more other members), and a member who has linked a secondary account may be considered a "participant" of the circle. Members may be associated with multiple roles and classifications, and may link multiple accounts of different types (financial and non-financial accounts, primary or secondary accounts, etc.) to the authentication circle. In various embodiments, linkable account types may include financial accounts (e.g., checking, savings, credit, brokerage, etc.), accounting, bookkeeping, bill payment, and invoicing accounts (e.g., QuickBooks), gig/sharing economy accounts (e.g., Uber, Lyft, etc.), social networking/social media accounts, etc. Accounts of different types may be used as sources of information, means of communicating with members and non-members, mechanisms for initiating transactions involving linked and non-lined accounts, and so forth.

A member who is a manager with respect to one or more primary accounts may be granted partial or full access to the primary account(s) and may be able to make at least certain changes (until the access is changed or revoked by the assisted member who linked the primary account to be managed by the manager). A member may be deemed a "spectator" with respect to one or more accounts if the member only has view-only access to some or all of the information in the account(s). A member who is an "administrator" may be tasked with establishing and/or terminating the authentication circle and/or with assigning or modifying roles and/or permissions in the circle, and may otherwise be an assisted member, a participant, a manager with respect to one or more linked accounts, and/or a spectator with respect to one or more linked accounts.

The above classifications and roles provide examples of how certain circles may be structured in different versions of the system, and may be assigned and modified at different points in time. The labels/nomenclature may utilize any terms deemed suitable, and the terms identified above (e.g., "primary," "secondary," "assisted," "participant," etc.) are intended as illustrative examples. Such optional terms, if used, need not be revealed to the members of the authentication circle, but instead may be used at the back end only to structure various elements, features, and interrelationships of the authentication circle and its members.

The provider computing system may be further structured to send requests to potential members (identified by, e.g., the individual requesting that the circle be established or another current member) to associate with ("join") the circle, and to receive an indication of acceptance of the request to join that authentication circle. The provider computing system may associate ("add" as members) the recipient(s) of requests to join the authentication circle responsive to the acceptance of the request(s), and generate an integrated view of a plurality of financial accounts of the members of the authentication circle. In certain implementations, the integrated view, as further discussed below, may provide information from linked accounts in the context of goals (financial or otherwise) and relationships between the members.

As described herein, the authentication circle may permit an entity (e.g., a first member, which may be a person, an organization, etc.) to manage an account of another entity (e.g., a second member, which may be a person, an organization, etc.). The permission may include full access to the account of the second member of the authentication circle, limited by the overall ability of the second member to remove access at any time. In other examples, the permission may include limited access by which the second member may access selected and/or predetermined features of the managed account. For example, the person managing (e.g., an account manager) the account of another person may only have view (e.g., read-only) access such that the account manager may not make changes to or otherwise conduct transactions using the account of the other person. In some examples, there may be limits on the types of transactions or dollar amounts of transactions that the account manager may execute or otherwise perform. In other examples, there may be limits on specific payees (or classes/types of payees, such as department stores or certain healthcare organizations) or purchases (or classes/types of purchases) which may be paid using funds from the account.

Further, this approach may prevent the member who is tasked with managing the finances of another to change the login credentials of (and effectively lock out) the other person. That is, an account may be accessed and used for transactions, but select information may be "locked" and not allowed to be changed (such as password, security questions, address, etc.). A person can revoke access to an account by, for example, making a selection in a user preferences section of the authentication circle when logged into the circle, and/or by changing one's username and password or other credentials (to prevent the authentication circle from accessing the account in the future in situations in which the credentials are required each time the account is accessed for the authentication circle).

In various embodiments, access to an account, even if effectively "full" (in the sense that a first member can initiate any transaction or change to personal information, such as address, that the second member could make), need not impart the ability to change the second member's login credentials. Changing the second member's login credentials would likely mean that, at least in the short term, the second member could no longer access his or her account (and thereby change or revoke access rights or unlink accounts from the authentication circle). In certain implementations, if the second member so wishes, the first member may be granted with the right to change the second member's login credentials. This may be granted, for example, if the second member wants the first member to be able to change the second member's login credentials in case, for example, the second member's login credential are compromised, forgotten, etc. In some implementations, the second member may be notified of a change (e.g., a change in the second member's personal information or login credentials). For example, an attempt by a first member to change the second member's login credentials may trigger a request for confirmation sent by a provider computing system or by a client application running on a device of the first member to a device of the second member. In some implementations, a notification may be sent informing the second member that the credentials will be changed and that the second member may, for example, retrieve and/or change the new credentials by, for example, selecting an activatable link provided with the notification.

In certain embodiments, a change by the first member of the login credentials of the second member may be reversible under certain conditions and/or for a certain time. For example, a change in the login credentials of the second member by the first member may trigger a notification to the second member that the login credentials have been changed. The second member may be allowed to undo the change within a predetermined time period (e.g., an hour, a day, a week, etc.) via, for example, activation of a link (e.g., a one-click link) in an e-mail or text message. Alternatively or additionally, the second member may be able to reverse the change or change the login credentials again using an alternative form of authentication, such as a biometric scan and/or entry of a code transmitted to a particular device or account of the second member. This allows the second member to choose to reset the login credentials, without needing to know the login credentials chosen by the first member who changed the second member's credentials. In some versions, such a reversal may trigger a suspension of the first member's privileges or otherwise require the second member to confirm that the first member should retain or regain access.

As one example, a person may learn via various channels that a family member has had a medical issue arise and will no longer be able to care for himself or herself. A son, for example, may learn that his mother has had a bad fall and will no longer be able to care for herself. The one or more user devices may comprise a digital voice assistant (e.g., configured as a smart speaker or other speech monitoring system) located in the home of the son and/or located in the home of the mother. While actively monitoring the son's and/or the mother's conversations, the digital voice assistant may ascertain that the mother has had the bad fall or identify another event detrimental to or otherwise affecting health or safety. This may be ascertained based on, for example, analysis of conversations (e.g., the mother, son, or other relatives discussing the fall or other event with each other or with others, in person or remotely), detection of a sound signature consistent with a fall (e.g., a crash, thump, or breakage), and/or detection of sounds consistent with a reaction to a fall (e.g., calling out for help, sounds of pain or agitation, unexpected silence when the person was in the midst of a telephone conversation, a reaction of surprise or concern by another person in the room, making a call to emergency services). In certain implementations, detection of an indicator of an event detrimental to health or safety may be necessary but not sufficient to determining that a user may wish to join or form an authentication circle. In some implementations, detection of an issue relevant to the event may also be required. For example, conversations may be monitored for a discussion (subsequent to identification or detection of the event) suggesting a user is in need of assistance, financial or otherwise. In some implementations, such a discussion may be in the context of the event (e.g., the bad fall is mentioned) or a general conversation (e.g., the fall is not mentioned).

The digital voice assistant may, at some point thereafter, query one or more users (e.g., the son and/or the mother) to determine whether the users wish to create an authentication circle. One or both of the digital voice assistants or other devices of the son and the mother, for example, may be connected to backend servers of the provider computing system, and the devices may monitor sounds and conversations and/or may prompt the mother and/or son about creating an authentication circle with each other. If both agree to creating the authentication circle, the son may utilize the authentication circle to obtain high level and detailed views of his overall financial status from one or more financial institutions (e.g., potentially including accounts spread across multiple institutions) along with an integrated view of the overall financial status of his mother (also potentially including accounts across multiple financial institutions). The mother may also be able to review account activity, though potentially with different roles and permissions than the son. For example, the mother may be allowed to view notes, conversations, transactions, etc., with full access to her own accounts but potentially restricted access to an account owned by the son. Agreement or consent to join/form an authentication circle may be expressed via, for example, voice prompt, biometric scan, registration process via a website or application of the provider computing system, or in another way. In some configurations, the son may drill down or access various financial areas (e.g., different types of expenses, savings, etc.) that may be impacted by his mother's medical situation.

As another example, a user (e.g., a parent) may utilize the provider computing system to establish a financial goal (e.g., a savings goal to save enough funds for one or more purchases) for his or her adult or minor child. The child may be saving, for example, for a trip, for college, or for a purchase. The parent and child may establish an authentication circle with themselves (and potentially others) as members to assist in tracking and reaching that goal. The child may be a spectator, a participant with one or more linked secondary accounts, or an assisted member with one or more linked primary accounts. The provider computing system may send alerts and notifications regarding, for example, status and progress. For example, the computing system may notify (e.g., via a user device as described herein) the child when he or she receives an infusion of funds, reaches a goal, etc. In some configurations, via the authentication circle, the parent may receive notifications regarding the progress his or her child is making towards reaching the goal. For example, the parent may receive a notification when the child has reached a milestone (e.g., percentage to a savings goal, reaching an account balance, or opening a new account) or achieved the established goal.

Once an authentication circle is established, members of the authentication circle may be provided with an integrated view or dashboard that allows for easy navigation between and among accounts (of one or more members, held at one or more different financial institutions with different permissions and accessibilities), and between and among members, and information relevant thereto. The integrated view/dashboard may be similar or identical for the members to facilitate discussions between and among members regarding the information in the dashboard. The integrated view/dashboard may vary in functionality based on role, identity, rights granted, etc. Navigating between accounts (e.g., to view balances, deposits, withdrawals, etc., corresponding to each account) and members (e.g., to view the expenses, goals, contributions, etc., corresponding to each member) does not require switching to other websites and applications (e.g., of other members and/or of other institutions) with separate authentication protocols (e.g., entering different login credentials for each), experiencing different timeouts for each (e.g., different amounts of time before the user is logged out and required to log back in), and different operating environments (e.g., different layouts, appearances, functionalities, etc.). The integrated view/dashboard also allows members to establish and assign goals, make contributions, etc., from multiple accounts and for multiple members at a central (virtual) location.

Various embodiments and implementations of the systems and methods disclosed herein also improve current computing systems by facilitating the management of an account of another person who joins an authentication circle. The system may include mechanisms (e.g., digital voice assistants, biometric authentication, and so on) for creating authentication circles to enable access to accounts of other members of the authentication circle. The members of the authentication circle may be family, friends, colleagues, or other individuals regardless whether they have a specific type of legal or familial relationship.

As described herein, the disclosed approach improves authentication of computing systems and devices wherein a member of the authentication circle manages the account of another member or a plurality of members. Using the disclosed approach, the identity of a person may be verified to prevent fraudulent activity and to ensure that each person who joins or otherwise participates in the authentication circle operates under the proper security roles and permissions. A member of the authentication circle may be authenticated based on the authentication credentials of that member without the need to know, use, or access the authentication credentials that belong to other members of the authentication circle, even though the personal/confidential information of other members may be available, and even though functionalities may be available that otherwise would have required logging into one or more different applications and/or websites using multiple login credentials of others. Authentication credentials may include or more of username and password, security questions, security access tokens, biometric data, device identifiers, internet protocol (IP) address, and so forth.

The disclosed systems, methods, and computer implementations moreover improve computing systems and devices by allowing multiple users to have financial information and/or control without the need to intermingle authentication or security information of the members. A computing system may provide for authentication circles that do not require members of the circle to enter account information for a transaction such as, but not limited to, a funds transfer. Without such requirements, the clock time, processing time, programmatic instructions required to authenticate multiple accounts, and other requirements of the central processing unit, memory utilization, and other system resources are reduced. Accordingly, authentication computing and system security are improved by, for example, providing the ability to identify a member of the authentication circle based on a device, application, or authentication protocol of the member such that the provision of additional identification information or account information of the (potentially many) other members is not required.

Once a member is authenticated, the member may be able to access and manage, for example, several accounts of multiple other members at various independent institutions (financial or otherwise). The login credentials of other members are not compromised because they are not needed for members to be able to interact with the authentication circle. The need to have separate authentication credentials to access each separate account is eliminated. Moreover, the need to share one's authentication credentials to share account information is also eliminated. If an account linked to the authentication circle is held at a financial institution and the financial institution is the same entity providing, maintaining, and/or administering the authentication circle, the financial institution may access the account (which may be stored locally or remotely in one or more databases) via its own computing systems. If the entity providing the circle is not a financial institution, or if the entity is a financial institution but a linked account is held at a different financial institution, the provider computing system may access computing systems used to administer the accounts for the financial institutions at which the linked accounts are held. For example, the providing entity may, via a network such as the internet, access one or more computing systems of financial institutions at which linked accounts are held and exchange relevant information. This may involve, in certain implementations, one or more an application programming interfaces (APIs) and/or application software development kits (SDKs) of the financial institutions involved. The providing entity may use the authentication credentials provided by the account holders or by other institutions to access the accounts. Such credentials may include security access tokens generated by other institutions for use to log in and access the accounts. The security access tokens may be provided with an API call to the other institutions or as part of a separate authentication process. The security tokens could be used to define or restrict access (e.g., view only, certain data only, certain transactions only, etc.) to the account according to the wishes of the account holder. The providing entity can apply strict security protocols to keep the credentials secure, and the credentials are known only to the computing system of the providing entity, and only for the limited purpose of accessing accounts linked to the circle, without being revealed with any other members of the circle.

Further, the disclosed approach improves computing systems by including one or more user devices structured to interact with (e.g., pervasively monitor and/or advise) members of the authentication circle via, for example, voice recognition algorithms such that the provider computing system and/or user devices can listen, receive, and interpret dictation and/or voice commands on an ongoing basis. In turn, the provider computing system (e.g., via a client application running on one or more user devices) may interactively provide financial planning advice or other advice (e.g., on purchases, travel, investing, seeking out services, etc.) to the members of the authentication circle via audio and/or visual means. As such, the systems, methods, and computer implementations disclosed herein improve the functioning of such systems and information management by providing functionalities that are unconventional technological improvements over current systems.

Referring to FIG. 1A, a block diagram of a system 100 is shown according to one or more example embodiments. System 100 may include a provider computing system 120 (which may include one or more computing devices of a service provider in one or more locations) in communication with one or more user devices 106 (which may include multiple computing devices of one or more users in one or more locations) via a network 114. In some embodiments, the provider computing system 120 may be the computing system of a financial institution that provides financial services (e.g., demand deposit accounts, credit accounts, etc.) to a plurality of customers. The financial institution may provide banking services to the customers by, for example, allowing customers to deposit funds into accounts, withdraw funds from accounts, transfer funds between accounts, view account balances, and the like via a provider computing system 120. In other embodiments, the provider computing system 120 is not a financial institution. In some embodiments, the provider computing system 120 may communicate or interact with one or more third-party computing systems 150. The system 100 is structured to facilitate the management of the authentication circle via the provider computing system 120 and user devices 106.

The provider computing system 120 may be a backend computer system that interacts with the user devices 106 and supports other services offered by the service provider, such as financial management and investment services. Accordingly, the provider computing system 120 may include one or more processors 122, memory 124, a network interface 126, a circle manager 128, a messaging module 130, a financial account linker 132, a user/transaction locator 134, a transaction monitor 136, an artificial intelligence (AI) engine 138, a goal manager 140, an external resource module 142, an authentication engine 144, a transaction engine 146, and an account database 148. The provider computing system 120 is structured to facilitate the provision of an authentication circle to manage a financial account of another person directly or via a network (e.g., the network 114). The network interface 126 may communicate over any of a variety of network protocols, including Ethernet, Bluetooth, Wi-Fi, and the like. The account database 148 is structured to maintain accounts associated with customers of the financial institution and to facilitate transactions associated with the accounts. The account database 148 may store transaction data and account information, including account numbers, account balances, customer contact information, customer preferences, security access tokens and other account information. As used herein, the term "transaction data" may be used to refer to data associated with a transaction such as, but not limited to, a payment, transfer, debit, credit, contribution, donation, etc., which may be associated with the account of a member of the authentication circle.

The components involved in the operations and functions of the provider computing system 120, and its interactions with user devices 106, may be implemented using hardware, software, or a combination thereof. The circle manager 128 and/or the goal manager 140, for example, may be configured to establish authentication circles and the members, goals, accounts (financial or otherwise) associated therewith. The circle manager 128 may also be tasked with keeping the data associated with members of authentication circles up-to-date. In certain implementations, the circle manager 128 and/or the goal manager 140 may acquire information on members (or potential members) and their goals and accounts via, for example, one or more user devices 106. In some implementations, circle manager 128 may acquire data via third-party computing systems 150. For example, circle manager 128 may determine identities and relationships of members (or potential members) from social networking systems (such as Facebook, Twitter, LinkedIn, etc.). In various implementations, the circle manager 128 may acquire account information (e.g., account balances, credit card charges, etc.) from internal (e.g., account database 148) or external (e.g., third-party) systems 150 (which may store account data in accounts database 152) of various financial institutions or other sources of information. Acquisition of account data and other information may be accomplished via, for example, financial account linker 132 and/or external resource module 142, both of which are further discussed below.

The messaging module 130 may be configured to exchange messages with, for example, members and potential members. The messaging module 130 may send and receive messages (which may contain text, sounds, images, data, etc.) to and from users via any messaging service or mechanism, such as short message service (SMS) messages sent over a cellular network, text messages sent via a network (e.g., Internet) connection via texting apps, and/or e-mail messages sent via, for example, Internet browsers or mail apps. In certain implementations, messages may be sent via messaging module 130 to, for example, invite members to join an authentication circle. Alternatively or additionally, messages may be sent via messaging module 130 to, for example, solicit payments, funds transfers, financial contributions, etc., as part of gifts, sharing of expenses, etc. The messaging module 130 may receive indications that an invitation or solicitation has been accepted, and in some implementations, may initiate the appropriate next steps (such as updating of information in an authentication circle via, e.g., circle manager 128) in response to the receipt of acceptances (which may be received via, e.g., a text message or a unique Internet hyperlink that, when visited, indicates a user's selection of acceptance or rejection).

When a member of an authentication circle wishes to add an account to a circle, the account may be held internally (if the provider computing system 120 is associated with a financial institution) or externally (e.g., at another financial institution). The financial account linker 132 may be configured to allow provider computing system 120 to access account data associated with one or more accounts that have been added to a circle by one or more members of the circle. The financial account linker 132 may use, for example, any combination of one or more application programming interfaces (APIs), software development kits (SDKs or devkits), or other hardware/software mechanisms that facilitate data exchange or communication between and among co-located or remote computing systems. In some implementations, the provider computing system 120 may, via the financial account linker 132, obtain account balances (of, e.g., checking and savings accounts and credit cards). In certain implementations, the provider computing system 120 may, via the financial account linker 132, initiate payments or other funds transfers on behalf of one or more members of an authentication circle.

The user/transaction locator 134 may be configured to determine, identify, and/or retrieve one or more locations associated with one or more user devices 106, or locations associated with one or more transactions relevant to the users/members. In some implementations, user/transaction locator 134 may be used, for example, to determine when/ whether two or more members are located at the same place (e.g., at home, at the same restaurant or other merchant, sitting at a table discussing a potential trip or other goal, near enough to be having a discussion or otherwise collaborating, in the same room at a school or conference, etc.) or otherwise within a certain vicinity of each other. In certain implementations, the user/transaction locator 134 may retrieve location data via a location tracker of one or more applications running on one or more user devices 106 (which may determine location using one or more location sensors or other components). Location data associated with users and/or transactions may be maintained as part of a location/transaction history for members of a circle.

The transaction monitor 136 of provider computing system 120 may be configured to identify and keep track of financial or other transactions of circle members or other users of user devices 106. These may be, for example, financial transactions of a member on a trip with other members. The members of a circle may be, for example, splitting expenses for the trip, and the financial transactions to be split automatically (or potentially split following confirmation) thus need to be tracked. In other situations, the expenses to be split are for a particular purpose, such as for a new baby or for a major purchase. A user may engage in transactions using, for example, mobile payment and digital wallet services, or via any app and/or device through which a user may make purchases, transfers, deposits, cash advances, etc. In some implementations, transactions may be monitored via access to financial account data that can be retrieved via financial account linker 132.

The AI engine 138 may be configured to analyze and combine inputs, make predictions on needs, transactions and goals, generate recommendations on circle formation and member activities, or any other tasks associated with computer learning and/or problem solving. In some implementations, AI engine 138 may be used to understand human speech or decipher imagery captured, for example, via ambient sensors of user devices (further discussed below) to understand the situation and/or needs of one or more members of an authentication circle. In some implementations, AI engine 138 may be configured to identify when a circle might be useful or beneficial based on, for example, communications involving potential members, purchase histories of potential members, or other activities or data points. Any artificial intelligence algorithms, logic, neural networks, or other tools may be used in implementing AI engine 138 for various desired purposes.

The goal manager 140 may be configured to allow members to set new goals, track progress towards goals, and determine the impact of different goals on one another. For example, a member wishing to set up a goal of covering medical expenses may be structured very differently from a goal of saving for a trip with family or friends. The goal manager 140 may acquire the needed inputs from one or more users (e.g., amounts to be saved or spent, how expenses are to be split, what sorts of expenses are expected, etc.) and guide members towards accounting for expenses that may not have otherwise been contemplated but which can be predicted based on the situation of the members (and/or based on the situation of other similarly-situated users with comparable goals, finances, habits, etc.). Establishing a new goal, or making changes to (or progress towards) an existing goal, may impact existing goals because, for example, allocating limited funds to one goal may decrease the availability of funds for other goals. In certain implementations, the goal manager 140 may acquire information (e.g., regarding balances in accounts available for a goal, the costs of different expenses from different merchants, relationships between members, etc.) from internal sources (e.g., databases maintained in different computing systems or by different units or divisions of the provider) or external (third-party) sources via, for example, external resource module 142, discussed below. The goal manager 140 may also generate user interfaces intended to solicit needed information and present relevant information in a useful and digestible manner to enhance effectiveness in assisting members achieve their goals.

The external resource module 142 may be configured to access, retrieve, process, and use data from information sources other than the provider computing system 120. This may include healthcare data sources, travel websites such as Expedia, Travelocity, and Kayak, as well as websites of airlines, train operators, bus operators, hotels, etc.), merchant websites (e.g., Amazon, Target, Walmart, Google Shopping, etc.) and other sources of information on expenses and costs of goods or services. In some implementations, the external resource module 142 may access a data source that may provide information on interbank exchange rates, allowing members to better track purchasing power when traveling abroad. In certain implementations, the external resource module 142 may access social networking websites (e.g., Facebook, Twitter, LinkedIn, etc.) for information on, for example, life events (e.g., birth, starting college, etc.) and familial or other relationships to propose formation of authentication circles with particular members, to propose new goals or changes to existing goals, to better predict needs (via, e.g., AI engine 138), etc. The external resource module 142 may also access such sources of information as: credit agencies to, for example, identify open accounts that may be available for achieving goals, anticipated cost of credit/loans (as a result of higher or lower interest rates due to lower or higher credit ratings, respectively) for particular members, etc.; news sources to identify, for example, weather patterns and current events that may impact the ability of members to proceed with plans; financial institutions; governmental bodies; and so forth.

The authentication engine 144 may be configured to verify identify and authorize access to accounts (such as access to the authentication circle, to external accounts at other institutions, etc.). The authentication engine 144 may use, for example, login credentials and biometric data acquired via user devices 106. In some implementations, authentication engine 144 may authenticate users by verifying the identity of the user device 106 via, for example, its unique ID (such as a serial number) or other identifying information. The transaction engine 146 may implement transactions (e.g., payments, transfer of funds, etc.) between accounts, users, etc.

Still referring to FIG. 1A, the user devices 106 may include one or more mobile and non-mobile devices such as smartphones, tablet computing devices, wearable computing devices (e.g., a smartwatch, smart optical wear, etc.), personal computing devices such as laptops, voice-activated digital assistance devices (e.g., smart speakers having chat bot capabilities), portable media devices, vehicle infotainment systems, etc., that may access one or more software applications running locally or remotely. In some examples, a customer or other user may access the provider computing system 120 through various user devices 106 at the same time or at different times. For example, the user may access the provider computing system 120 via a digital assistance device 106 while also accessing the provider computing system 120 using a wearable computing device 106 (e.g., a smart watch). In other examples, the user may access the provider computing system 120 via a digital assistance device 106 and later access the provider computing system 120 via a vehicle infotainment system 106.

As indicated, the one or more computing devices 106 may communicate with the provider computing system 120 through the network 114. Each user device 106 may interact with provider computing system 120 using one or up to "N" devices, where N is any number greater than one. In some arrangements, the network 114 includes the internet, cellular networks, personal area networks, peer-to-peer networks, Wi-Fi networks, etc. The user devices 106 may include one or more specialized devices configured for use in engaging generally with the provider computing system 120, and/or engaging specifically in authentication circles administered by the provider computing system 120. Alternatively or additionally, the user device 106 may include one or more multipurpose computing devices capable of executing a downloadable application associated with the provider to facilitate the provision of the authentication circle. In some arrangements, the application is executed locally on the user devices 106 (e.g., a smartphone, tablet computing device, etc., running one or more applications). In other arrangements, the user device 106 may be a virtual assistance device (which may implement, e.g., Google Assistant, Amazon Alexa, etc.) communicatively coupled to the provider computing system 120 directly or via a third-party computing system 150 (e.g., servers of Google, Amazon, etc.). Members may use, via the user device 106, the application to access various services provided by the provider computing system 120. In some embodiments, members may use the application to access, via the provider computing system 120, accounts of other members of an authentication circle. The application may also be used to provide members with the integrated view/dashboard of the authentication circle.

Figure 1B:
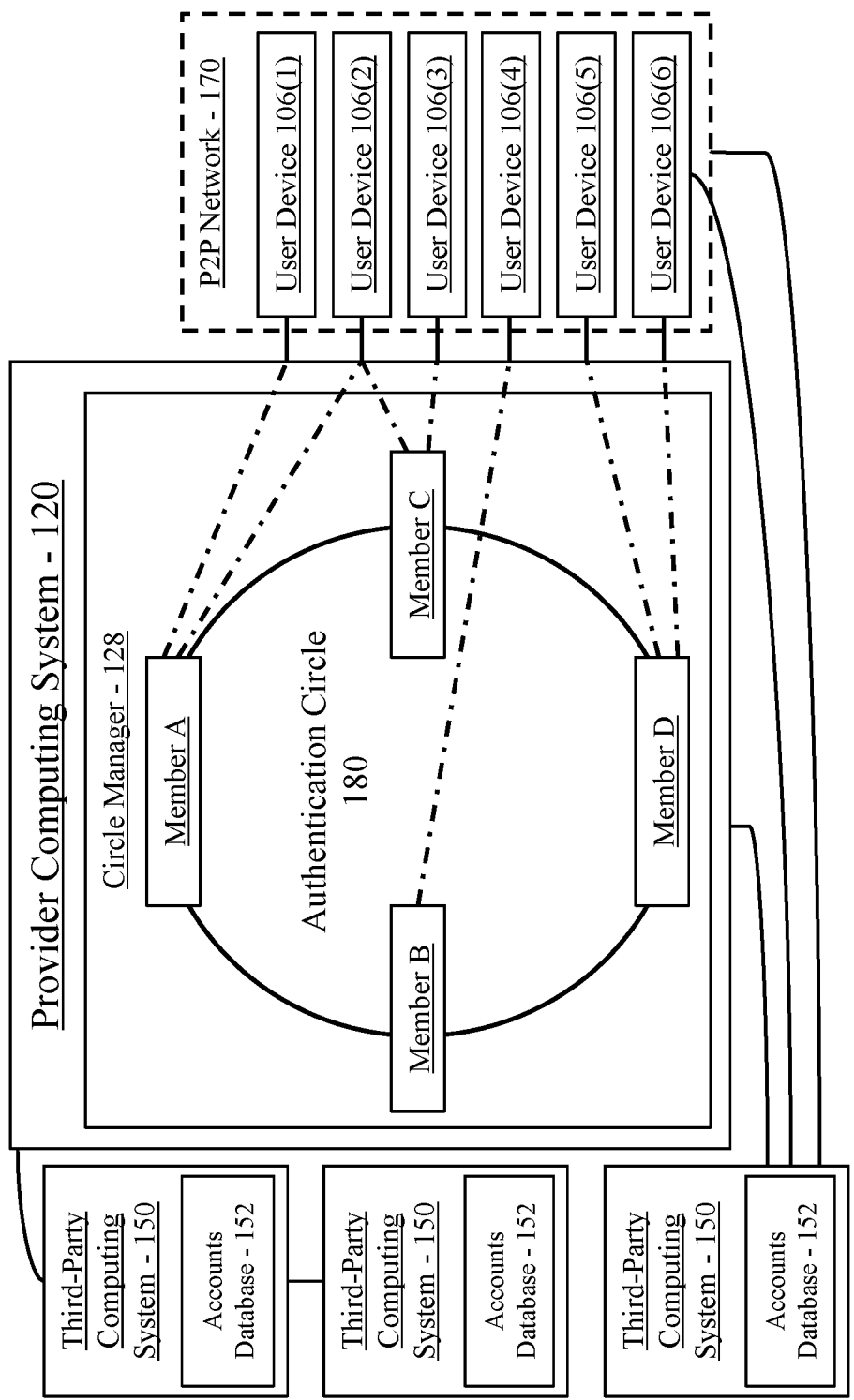
FIG. 1B is a block diagram of the system of FIG. 1A showing relatedness in an example authentication circle, according to one or more example embodiments.

FIG. 1B illustrates an example data flow interaction between user devices 106 that may optionally be associated with a peer to peer (P2P) network 170 (e.g., a social network, a network of devices structured to share resources, interact, communicate, etc., without accessing a separate server, other suitable network, or combination thereof) and components of the provider computing system 120. The provider computing system 120 may communicate with one or more third-party computing systems 150, which may communicate with each other. The one or more user devices may communicate with provider computing system 120 via one or more third-party computing systems 150. The circle manager 128 may be structured to maintain an authentication circle with Members A, B, C, and D, who may be working towards a financial goal or may otherwise be managing joint finances. A person (e.g., Member A) may wish to be part of an authentication circle with one or more persons (e.g., Members B, C, and D) to assist with management of a single financial account or a plurality of financial accounts. Member A may have provided an identifier (e.g., an email address, user ID, profile ID, screen name, contact number, etc.) associated with each of Members B, C, and D to the provider computing system 120, which in turn may have generated and provided requests to join the authentication circle 180 to user devices 106 associated with Members B, C, and D. Each of Members B, C, and D may have received the request to join the authentication circle 180 via one or more of their user devices 106. An indication of acceptance of the request to join the authentication circle 180 may have been received when the recipient, for example, clicked a link, button, image, and/or icon via user devices 106. In other examples, an indication of the acceptance of the request to join the authentication circle 180 may have been received when the recipient, for example, audibly accepted the request by voice command (e.g., by speaking "yes, I will join" or other prompt(s) deciphered via AI engine 138 or another component of user device 106 and/or third-party computing system 150) and/or by otherwise speaking a word or phrase such that user devices 106 (which may provide audio inputs to provider computing system 120 via a network, in certain implementations) heard, received, and/or interpreted the dictation of the audible response as acceptance or a potential acceptance of the request. In some implementations, acceptance may have been indicated in other ways, such as by specific gesture or submission of a biometric (e.g., by placement of a thumb on a fingerprint reader). In turn, the recipient of the request to join the authentication circle may have been connected to, via the user devices 106, or otherwise associated with, the authentication circle 180 in response to the acceptance received by the circle manager 128.

As depicted in FIG. 1B, Member A may use, or be detectable to, user devices 106(1) and 106(2); Member B may use, or be detectable to, user device 106(4); Member C may use, and/or be detectable to, user devices 106(2) and 106(3); and Member D may use, or be detectable to, user devices 106(5) and 106(6). A device may be used by, or may detect, a member even if the device does not belong to the member. For example, user device 106(2) may belong to one spouse (e.g., Member A) but may detect a voice signature of another spouse (e.g., Member C). Similarly, user devices 106(5) and 106(6) may belong to Member D's parents, but may detect Member D because the three live together. In various implementations, the associations between devices, members, networks, etc., may be maintained in account database 148.

If a user device 106 is already known to provider computing system 120 (e.g., the user device 106 is associated with a unique ID known to the provider computing system 120 as a result of prior transactions) such that members can be identified and authenticated to provider computing system 120 by virtue of a prior relationship, members may not be required to provide additional identification or account information to provider computing system 120. Once authenticated, members may be provided with an integrated view of a plurality of accounts linked to the authentication circle 180 to, for example, assist in managing one or more financial and/or non-financial accounts. The integrated view (examples and portions of which are represented in FIGS. 4-9) may display a plurality of accounts as a group, at a group level, or according to a filter taking into account the specific financial situations of each member in the authentication circle. Different persons may be provided with different integrated views that provide different information based on their roles, responsibilities, and permissions in the circle. For example, a young child or spectator may in certain versions be provided with information on his or her progress towards a goal, but not the balances in linked accounts of the circle.

Figure 2:
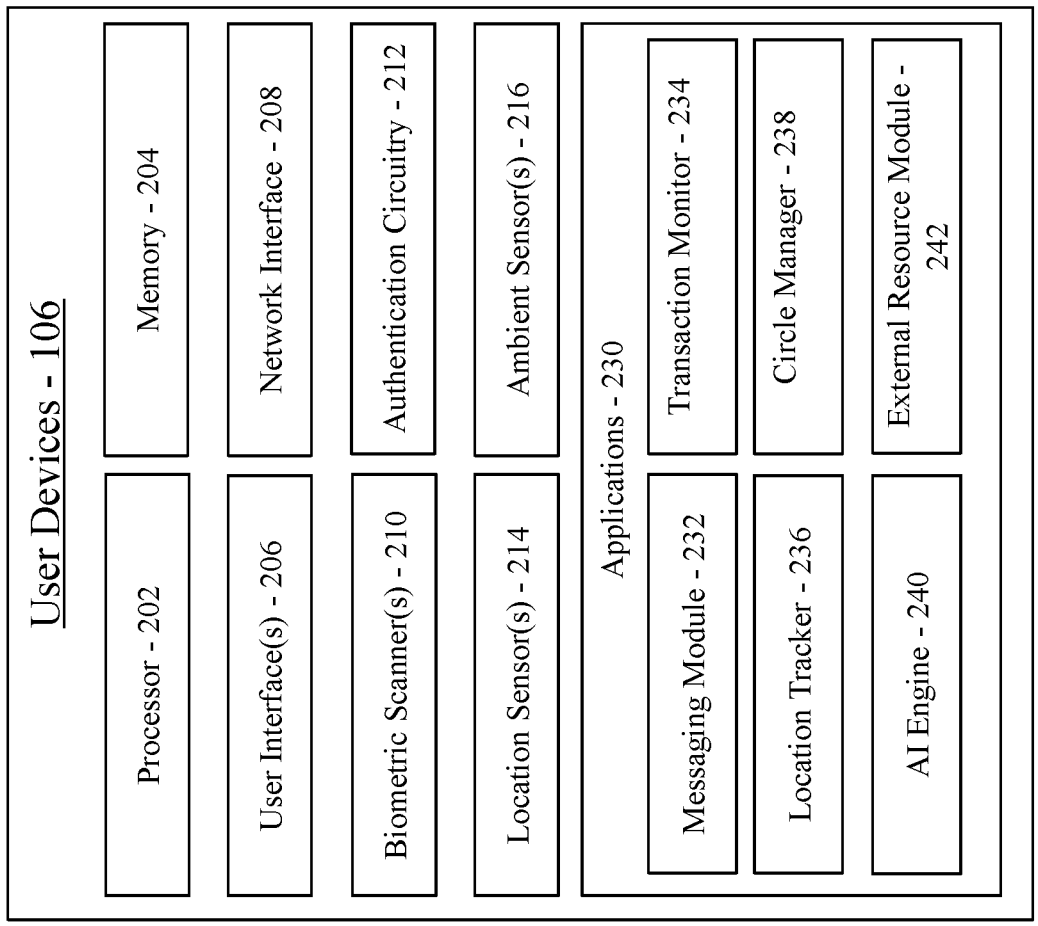
FIG. 2 is a block diagram of a user device according to one or more example embodiments.

Referring to FIG. 2, a block diagram of the user device 106 is shown according to example embodiments. Each user device 106 may include a processor 202, a memory 204, user interfaces 206, and a network interface 208. The processor 202 may be implemented as a general-purpose processor, an ASIC, one or more FPGAs, a DSP, a group of processing components, or other suitable electronic processing components structured to control the operation of the user device 106. The memory 204 (e.g., RAM, ROM, NVRAM, Flash Memory, hard disk storage) may store data and/or computer code for facilitating at least some of the various processes described herein, as well as one or more data repositories (which may include, e.g., database records such as user data and acquired information). In this regard, the memory 204 may store programming logic that, when executed by the processor 202, controls the operation of the device 106. The user interfaces 206 include any input (e.g., keyboard, mouse, touchscreen, microphone for voice prompts, notification LEDs, buttons, switches, etc.) and output devices (e.g., display screens, speakers for sound emission, etc.) deemed suitable for operation of the device 106. The network interface 208 may be structured to allow the device 106 to communicate data to and from other systems (e.g., via network 114) either directly or indirectly. The network interface 208, which may be a wireless network interface, may include any of a cellular transceiver (e.g., CDMA, GSM, LTE, etc.), a wireless network transceiver (e.g., 802.11X, ZigBee, Bluetooth, etc.), or a combination thereof (e.g., both a cellular transceiver and a Bluetooth transceiver). Additionally, the network interface 208 is capable of communicating with the provider computing system 120 via the network 114 (e.g., via any combination of the internet, cellular networks, personal area networks, Wi-Fi networks, etc.). The user devices 106 may be mobile and non-mobile computing devices of one or more users and/or third-parties (i.e., any entities other than the service provider associated with the provider computing system 120).

User device 106 may also include one or more biometric scanners 210, such as fingerprint scanners, cameras for facial, retinal, or other scans, microphones for voice signatures, etc. In conjunction with, or separate from, the biometric scanners 210, each user device 106 may include authentication circuitry 212 to allow the user device 106 to engage in, for example, financial transactions (such as payments mobile payment and digital wallet services) in a more secure manner. Various user devices 106 may include one or more location sensors 214 to enable user device 106 to determine its location relative to other physical objects or relative to geographic locations. Example location sensors 214 include global positioning system (GPS) devices and other navigation and geolocation devices, digital compasses, gyroscopes and other orientation sensors, as well as proximity sensors or other sensors that allow the user device 106 to detect the presence and distance of nearby objects. User device 106 may also include ambient sensors 216 that allow for the detection of sound and imagery, such as cameras (e.g., visible, infrared, etc.) and microphones, in the surroundings of device 106. It is noted that a device's microphone is an ambient sensor that may be used as a biometric scanner if it is involved in recording the voice of a user for authentication.

Each user device 106 may include one or more applications 230 ("apps") that aid the user device 106 in its operations and/or aid users of the user device 106 in performing various functions with the user device 106. Applications 230 may be stored in memory 204 and executed using processor 202, and may interact with, or otherwise use, one or more of user interfaces 206, network interface 208, biometric sensors 210, authentication circuitry 212, location sensors 214, and/or ambient sensors 216. Example components of one or more applications 230 include a messaging module 232 configured to send and receive messages (which may be in the form of text, sounds, images, video, etc.) via, for example, electronic text messages (SMS or otherwise), electronic mail (e-mail) messages (accessed via browsers, mail applications, etc.), notifications (such as banners) or sound alerts, etc. A transaction monitor 234 is configured to identify and keep track of financial or other transactions. A user may engage in transactions using, e.g., mobile payment and digital wallet services, or via any app and/or device through which a user may make purchases, transfers, deposits, cash advances, etc. The transaction monitor 234 may access such services and applications to obtain transaction data.

A location tracker 236 may be configured to track (using, e.g., one or more location sensors 214) the physical location of the user device 106. The location tracker 236 may be configured to identify the location of the user device at specified points in time or when triggered by identified events, such as the location of the user device 106 when a purchase occurs, when a device is turned on or off, when an application is launched, etc. The location of user device 106 may be presumed to correspond with the location of one or more users associated with (such as associations depicted in FIG. 1B) the user devices 106, and/or the location at which an event occurred. In different implementations, location may be determined without using location sensors 214. For example, location of user device 106 may be determined by determining the location of a merchant at which a purchase occurred using a payment app on user device 106. Additionally or alternatively, location may be determined using other sensors, such as ambient sensors 216 used to detect sounds and videos that are recognized as indicative of a certain physical location of the user device 106 (such as a the sounds heard over a public announcement system of a particular landmark such as a train station or airport).

Applications 230 may also include a circle manager 238 that is configured to, for example, keep track of authentication circles and their members, goals, milestones, activities, etc. In various implementations, the circle manager 238 may be implemented in addition to or in place of circle manager 128 of provider computing system 120. The circle manager 238 may maintain some or all circle data locally in one or more memories 204 of user device 106, and it may also transmit some or all of the circle data acquired via user devices 106 to provider computing system 120.

Applications 230 of user devices 106 may also include an AI engine 240 configured to analyze and combine inputs, make predictions on transactions and goals, generate recommendations on circle formation and member activities, or any other tasks associated with computer learning and/or problem solving. In some implementations, AI engine 240 may include a chat bot that is used to understand human speech captured via a microphone of ambient sensors 216 to understand the situation and/or needs of one or more members (or potential members) of an authentication circle. In some implementations, AI engine 240 may be configured to identify when an authentication circle might be useful or beneficial based on, for example, discussions involving potential members, behaviors of other users, etc. Various artificial intelligence algorithms, logic, neural networks, and/or other tools may be used in implementing AI engine 240 for various desired purposes.

Applications 230 may additionally include an external resource module 242 configured to access, retrieve, process, and use data from information sources other than the user device 106. This may include travel websites, merchant websites, and other sources of information on expenses and costs of goods and/or services. In some implementations, the external resource module 242 may access a data source that may provide information on interbank exchange rates, allowing members to better track purchasing power when traveling abroad. In certain implementations, the external resource module 242 may access social networking websites for information on, for example, life events and familial or other relationships to propose formation of authentication circles with particular members or to propose new goals or changes to existing goals, to better predict needs (via, e.g., AI engine 240 and/or AI engine 138), etc. The external resource module 242 may also access other sources of information, such as credit agencies, news sources, financial institutions, governmental bodies, and other sources.

Although the above discussion identifies a set of modules that perform specified functions, in various implementations, the above (and other) functions may be performed by any module in the system 100. Functions collectively performed by provider computing systems 120 and/or user devices 106 in the above discussion may thus be redistributed (i.e., differently apportioned or distributed) among the modules of the provider computing systems 120 and user devices 106, consolidated into fewer modules, or expanded such that they are performed by a greater number of (separate) modules than illustrated above. Similarly, functions performed by the above modules of one or more provider computing systems 120 may additionally or alternatively be performed by modules of one or more user devices 106, and functions performed by the above modules of one or more user devices 106 may additionally or alternatively be performed by modules of one or more provider computing systems 120.

Figure 3A:
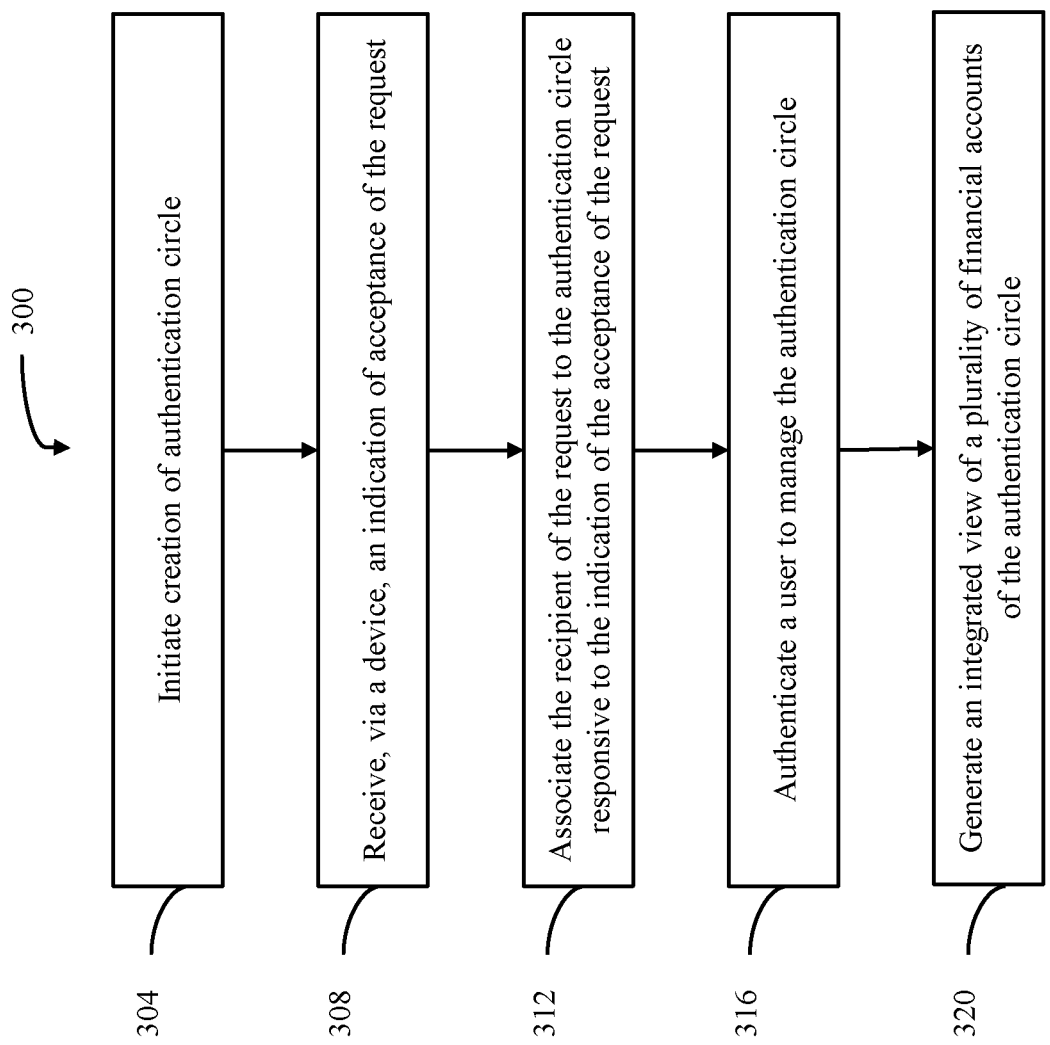
FIG. 3A is a flow diagram of an example method of providing an authentication circle, according to one or more example embodiments.

Referring to FIG. 3A, a flow diagram of a method 300 for providing an authentication circle structured to facilitate management of one or more accounts of another person is described according to an example embodiment. The financial account(s) may be administered by provider computing system 120 or by a third-party computing system 150 of another institution. For example, the provider computing system 120 may be configured to communicate with, access, or otherwise work across financial institutions such that financial accounts held at or otherwise associated with other financial institutions may be (seamlessly) integrated with the authentication circle. The provider computing system 120 may be configured to access accounts of a customer that are spread across multiple financial institutions that may or may not be affiliated with the service provider that administers the authentication circle.

The method 300 begins when the creation of an authentication circle is initiated by the provider computing system 120 at 304. In some embodiments, the creation of the authentication circle is initiated based on inputs received via the user devices 106. An input may be a user clicking and/or tapping a link, button, image, icon, graphic, etc. In another example, the input may be a swipe generated responsive to a hand and/or finger gesture provided by a user of a user device 106. Yet in another example, the input may be a voice command such that the input may be words spoken by the user and captured via the user device 106. For example, the user device 106 may proactively listen to a conversation of the user, and ask the user if he or she wants to create an authentication circle. As another example, the creation of the authentication circle is initiated or recommended based on transactions conducted by the user (e.g., a series of purchases that informs the system of a life event or financial circumstances as identified by, e.g., transaction monitor 136). For example, if a user makes purchases significant in number or monetary amount from a baby store to be shipped to a related person (e.g., a family member or a person which whom finances are interrelated), or purchases items off of a baby registry of the related person, the system may establish or recommend an authentication circle that includes the user and the related person as members. The recommendation may further propose one or more financial goals, such as saving for college. Similarly, an authentication circle may be recommended to friends, with a goal of saving or arranging for a baby gift or baby shower. The transactions or purchases may involve, for example, one or more financial accounts (e.g., credit cards, debit cards, checking accounts, etc.) of the user administered by the provider computing system 120 and/or by a third-party computing system 150 at the financial institution. In some implementations, information on the life events and/or financial circumstances may also be retrieved from, for example, non-financial accounts accessible to the financial institution, such as social networking accounts, merchant accounts, etc. Such accounts may be linked or otherwise accessible to the authentication circle.

An authentication circle may be created/established via the provider computing system 120 in response to a request from a user to create the authentication circle, which may concurrently or subsequently involve the user identifying one or more members to be invited to join the authentication circle. The requesting user may wish to be, for example, an "assisted" member with one or more primary accounts linked to the authentication circle, or the requesting user may be a manager who wishes to manage one or more accounts of another user. In other situations, the requesting user may be an administrator (who may or may not be in the same family) who believes that a person could use assistance managing his or her finances, but who would not have any management role in the authentication circle (or even a role as a participant or spectator), such as a friend, a healthcare provider, a financial advisor, a social worker, etc. In certain implementations, the authentication circle is not established until one or more potential members have accepted an invitation to join the authentication circle. In other implementations, the authentication circle is not established until one or more "key" members have joined, such as a member whose finances are to be managed, a member for which a goal is identified, and/or one or more members (participants) with a predetermined proportion (say, 25% or 50%) of the finances to be contributed or otherwise considered in the overall financial situation of one or more of the members of the authentication circle.

The initiation of an authentication circle may begin with or include an invitation to one or more potential members to join the authentication circle (which may be, e.g., an established authentication circle or one to be established once certain members, or a certain number of members, have agreed to join). Alternatively or additionally, the initiation of the authentication circle may include a request to another person to create an authentication circle and become one of its members. For example, a person associated with the user device 106 may provide or otherwise receive, via circle manager 128 and/or circle manager 238, a request to create an authentication circle. The request may be displayed using user interfaces 206 (e.g., a display) via, for example, an application 230 as, for example, an in-app message or via a social media application.

In certain instances, wherein the initiation of the authentication circle includes a request to create an authentication circle, the circle manager 128, for example, may receive the request to create the authentication circle via the user device 106. A person may add one or more persons to an authentication circle to help manage a financial account of another person (e.g., an elderly parent, a spouse, and children) and/or to assist with meeting a financial goal (e.g., an individual expense, shared expense, joint fund, fund goal, financial gift, or a combination thereof), etc. A user of the user device 106 may select a button, link, icon, and/or image structured to indicate an interest to add a person to the authentication circle. For example, responsive to requests from a user, the circle manager 128 of the provider computing system 120 may generate and send messages via messaging module 130 (e.g., text, audible messages, etc.) inviting others to join the authentication circle. In turn, the goal manager 140 may prompt the person to set up financial goals for individual members of the authentication circle. For example, a parent may set a financial goal for a child who is saving for a trip. In another example, a child may set a financial goal to meet the living expenses for an elderly parent who can no longer care for himself or herself.

A person may provide the provider computing system 120 with an identifier (e.g., such as, but not limited to, an email address, user ID, profile ID, screen name, contact number, etc.) associated with the individual that the person desires to add to the authentication circle. As described in a previous example, a parent of a customer of the financial institution may no longer be capable of caring for herself such that the customer may add that parent to an authentication circle to provide the customer with the capability to manage the care and finances of the parent more directly. The customer may provide identifiers (e.g., an email address or phone number) for one person (e.g., the mother of the customer) or to any number of individuals that the customer desires to add to the authentication circle. In some examples, the customer may provide identifiers for their respective siblings in addition to the identifier for their parent. In response to receiving the identifiers, the circle manager 128 may transmit the request to join the authentication circle to the user device 106 of the identified individuals (e.g., to the user device 106 of the parent of the customer). In some examples, the customer may add an individual (e.g., a parent, spouse, sibling, or child) to the authentication circle according to a power of attorney, guardianship, parental relationship, and/or combination thereof. In other examples, a couple that does not desire to co-mingle accounts may create an authentication circle to manage joint finances, individual finances, etc. in the event that there is a need for one spouse to manage the finances of the other spouse, and/or for the financial goals of, for example, paying joint bills or expenses, purchasing a home, etc. In another example, a parent may create an authentication circle for the purpose of assisting a child with meeting a financial goal such as saving to take a trip or paying for summer camp, or other desired goal (e.g., achieving a specified credit score, such as 700). In some configurations, the provider computing system 120 may suggest or recommend that the customer add an individual to an authentication circle based on the association of users and/or devices as depicted in FIG. 1B.

In some examples, the request to join an authentication circle structured to meet a financial goal may be received or otherwise generated via the circle manager 128 based on a transaction indicative of a life event (e.g., an event that may have a financial impact such as, but not limited to, a health issue, pregnancy, etc.). In this regard, the circle manager 128 may be structured to generate an authentication circle prompt via messaging module 130 (e.g., a message, notification, or other communication that prompts the recipient to create an authentication circle) based on one or more transactions indicative of a financial need, change in finances, or financial goal. The authentication circle prompt may be structured to initiate the creation of the authentication circle. For example, the circle manager 128 may prompt a member of the financial institution who is listed as an emergency contact on the financial account of another person to create an authentication circle based on recent transaction history (e.g., transactions or payments indicative of a change in financial need, such as late payments, underpayment, etc.), and/or other account information. The transaction data generated from the transaction may captured via the transaction monitor 136 and stored in account database 148. The transaction monitor 136 may query account database 148 to determine whether there are transaction data indicative of a financial need, change, or goal. The messaging module 130 may provide the authentication circle prompt to the user device 106 to invite the user of the user device 106 to establish and/or join an authentication circle.

In some arrangements, the one or more user devices 106 may be structured to detect a voice input via ambient sensors 216 (e.g., voice, voice key, voice trigger, word, etc.) indicative of an event and/or indicative of user account information associated with a user and the provider computing system 120. In turn, the one or more user devices 106 may receive event data based on the voice input of the user (e.g., the customer, member, and/or other person). The provider computing system 120 and/or one or more user devices 106 may utilize speech recognition and natural language processing to receive such event data via, for example, AI engine 138 and/or AI engine 240. The AI engines 138 and/or 240 may engage in a conversation with the customer via auditory (e.g., a voice input) or textual based programmatic algorithms. In response to receiving the event data, the user device 106 may provide advice or otherwise make suggestions to the customer. For example, the user device 106 may prompt, via the AI engines 138 and/or 240, the customer to create an authentication circle and/or to invite others to join an authentication circle that has been established. The voice input may be received by ambient sensors 216 (e.g., microphone or other audio components) of the one or more user devices 106. In some examples, the AI engines 138 and/or 240 may scan for keywords and/or word patterns within the voice input to identify issues and needs, formulate recommendations, etc.

In the present example, the circle managers 128 and/or 238 may be structured to generate an authentication circle prompt (via messaging modules 130 and/or 232) based on the voice input received. For example, listening to a conversation of the customer, the user device 106 and/or provider computing system 120 may understand that the customer's mother fell and can no longer take care of herself. As a result, the user device 106 may ask the customer whether the customer wishes to add the mother to an authentication circle that is to be established or to an existing authentication circle.

At 308, an indication of acceptance of the request to join an authentication circle may be received by the circle manager 128 via the user device 106. The circle manager 128 may receive the indication of acceptance to join the authentication circle when the user of the user device 106, for example, clicks a link, button, image, and/or icon. Alternatively or additionally, the user device 106 may receive the indication of acceptance as a voice input (e.g., the user says a voice trigger or voice key, such as, but not limited to, "join authentication circle," "I want to join the authentication circle," "contribute funds," "I want to contribute," "I can cover mom's expenses," "I will cover mom's expenses," etc.). In some examples, the circle manager 128 may receive an acceptance of the invitation and allow the added member to send and/or receive financial notifications (e.g., messages) from other members of the circle.

The recipient of the request to join the authentication circle may be connected/joined to (or otherwise associated with) the authentication circle in response to the indication of the acceptance of the request at 312. For example, the circle manager 128 may identify and associate the user device 106 with the authentication circle via a service provider application 230 that is associated with and/or received via the provider computing system 120 and that is running on the user device 106. The circle manager 128 may similarly identify and associate a mobile identification number (MIN), a mobile subscription identification number (MSIN), and/or other identifier associated with the recipient (e.g., the new member) of the authentication circle. In some implementations, one or more of these may be useful for identifying/authenticating a member/user device 106. In examples wherein a contribution is made to the authentication circle, the transaction engine 146 may cause a funds transfer (e.g., an electronic transfer of funds, currencies, cryptocurrencies, etc.) comprising at least the financial contribution designated by the user between one or more linked user accounts to increase the group progress towards the financial goal. The provider computing system 120 may be further structured to cause a funds transfer comprising a financial ("matching") contribution associated with a user account of the authentication circle that matches a financial contribution associated with another user account of the authentication circle. For example, the provider computing system 120 may cause a funds transfer from an account of a member of the authentication circle to match a contribution amount provided by another member. Alternatively or additionally, the provider computing system 120 may cause a funds transfer from an account of a member of the authentication circle to match a financial goal of another member (e.g., as a reward) when that financial goal is met. If one or more new accounts are needed for the funds (which may be used, e.g., to meet the financial needs of an assisted member or for a goal of one of the members), one or more members may be allowed to create a new account (e.g., a savings account or a certificate of deposit) to be linked to the authentication circle for funds deposits. The goal manager 140 may track the progress of the members of the authentication circle towards meeting various financial goals (e.g., by comparing the funds in one or more newly-created or existing accounts with goals established by one or more members).

Prior to allowing the person to manage the authentication circle, a member may be authenticated at 316 to manage the authentication circle. In some examples, prior to allowing the person to accept the request to join an authentication circle, the person may be authenticated as an account holder. A member of the authentication circle may be authenticated based on the authentication credentials of that member. In arrangements in which the user device 106 is running an application 230 associated with the provider computing system 120, the user device 106 may receive and transmit user authentication data (e.g., data indicative of the identity of a member of the financial institution and/or a user of various systems, applications, and/or products of the financial institution) via the application 230. In such arrangements, the member can be identified and authenticated based on/using the application 230 associated with the service provider such that additional identification information, account information, or credentials from the member are not required. The user authentication data may include any of a password, a PIN (personal identification number), a user ID, an answer to a verification question, a biometric, an identification of a security image, or a combination thereof. The authentication engine 144 may be used to compare the received authentication data with known and verified user authentication data. If the authentication data provided does not match the known and verified user authentication data, the person is not authenticated. If the authentication data provided matches the known and verified user authentication data, the person is authenticated.

In some examples, the provider computing system 120 may utilize voice recognition to authenticate a person as an account holder and/or as a member of the circle. For example, the provider computing system 120 may utilize voice recognition to authenticate the son who learned that his mother had a bad fall or has become ill. The provider computing system 120 may ask the mother and son via their respective user devices 106 (e.g., via each of their digital assistants, smart speakers, etc.) if they would like to create and/or join an authentication circle. In response to one or more user devices 106 receiving a response (e.g., "yes") from each of the mother and son, the authentication circle may be created by circle manager 128. The voice of the user may be used to generate a voice signature. The voice signature may be used for voice authentication when seeking to access the circle. The son may then access the account of the mother using his voice without using the login credentials of the mother.

The member who has been authenticated may manage a single financial account of another member of the authentication circle using his or her own authentication credentials without the need to use the login credentials of the member associated with a particular financial account. Alternatively or additionally, the member, once authenticated, may manage a plurality of financial accounts associated with the respective members of the authentication circle without the need to use the login credentials of such respective members. For example, a member may use his or her own login credentials (which may otherwise be used to access only his or her own account at one institution) to access or otherwise manage one or more accounts at one or more institutions associated with one or more other members of the authentication circle.

In some examples, the circle manager 128 may be structured to generate an integrated view of a plurality of accounts of the authentication circle at 320. In this regard, the user device 106 may display, output, or otherwise generate an integrated view of the combined finances of the members of the authentication circle. The provider computing system 120 may provide the integrated view of linked accounts associated with the service provider corresponding to the provider computing system 120 and/or institutions associated with third-party computing system 150 (e.g., accounts associated with, held by, or otherwise provided by multiple financial institutions).

In certain implementations, the integrated view provides "real-time" information that can be updated by the time a member logs into the authentication circle to access the information, and/or while the member is logged in. Alternatively or additionally, the account information can be periodically updated by accessing linked accounts on a schedule, such that the information is no more than, for example, two minutes, 20 minutes, two hours, or one day old. The update schedule may be predetermined by the providing entity, and/or may be selectable by a member. In other implementations, the integrated view can include information automatically retrieved (upon login or according to a schedule) by a backend server from account databases and/or other financial institutions, in combination with financial data entered manually by a member (such as a dollar amount that is to be contributed by a member or non-member, but that is not in a linked account) via the dashboard of the circle.

The provider computing system 120 may include or communicate with a third-party computing system 150 structured to provide relevant data associated with a member of the authentication circle. The data may be utilized by the AI engine 138 to generate financial advice. For example, various third party systems and/or applications, such as health systems, credit systems, or any other suitable system may interface with the user device 106 and/or the AI engine 138 to provide relevance data associated with a member of the authentication circle. This relevance data may be used in various ways. For example, achieving a minimum credit score or certain health milestones may provide non-monetary primary or secondary goals for one or more members. Achieving a goal (e.g., overcoming a condition) may trigger the cessation or modification of management or access by another member overseeing one or more linked accounts. In other implementations, data (e.g., health data or credit data) from third-party computing systems 150 may be used in anticipating future expenses to be covered (such as costs for certain medications or procedures, or increased or lowered costs of a loan due to higher or lower interest rates based on a lower or higher credit score of the member).

Alternatively or additionally, the AI engine 138 may be structured to generate financial advice based on a voice input received as a user device 106 listens to the conversations of a single member or a plurality of the members of the authentication circle. The financial advice may be generated based on one or more user accounts associated with the authentication circle. Accordingly, the user device 106 may utilize speech recognition and natural language processing to listen to the conversations of the user and then make suggestions for performing tasks such as, but not limited to, the creation of a savings goals, a savings plan, an investment portfolio, a savings strategy, etc. The user device 106 may provide advice or otherwise make suggestions to the customer via user interfaces 206. The user device 106 may provide advice or otherwise make suggestions to the customer in response to transaction data indicative of a credit, deposit, debit, or other like event associated with a user account.

Figure 3B:
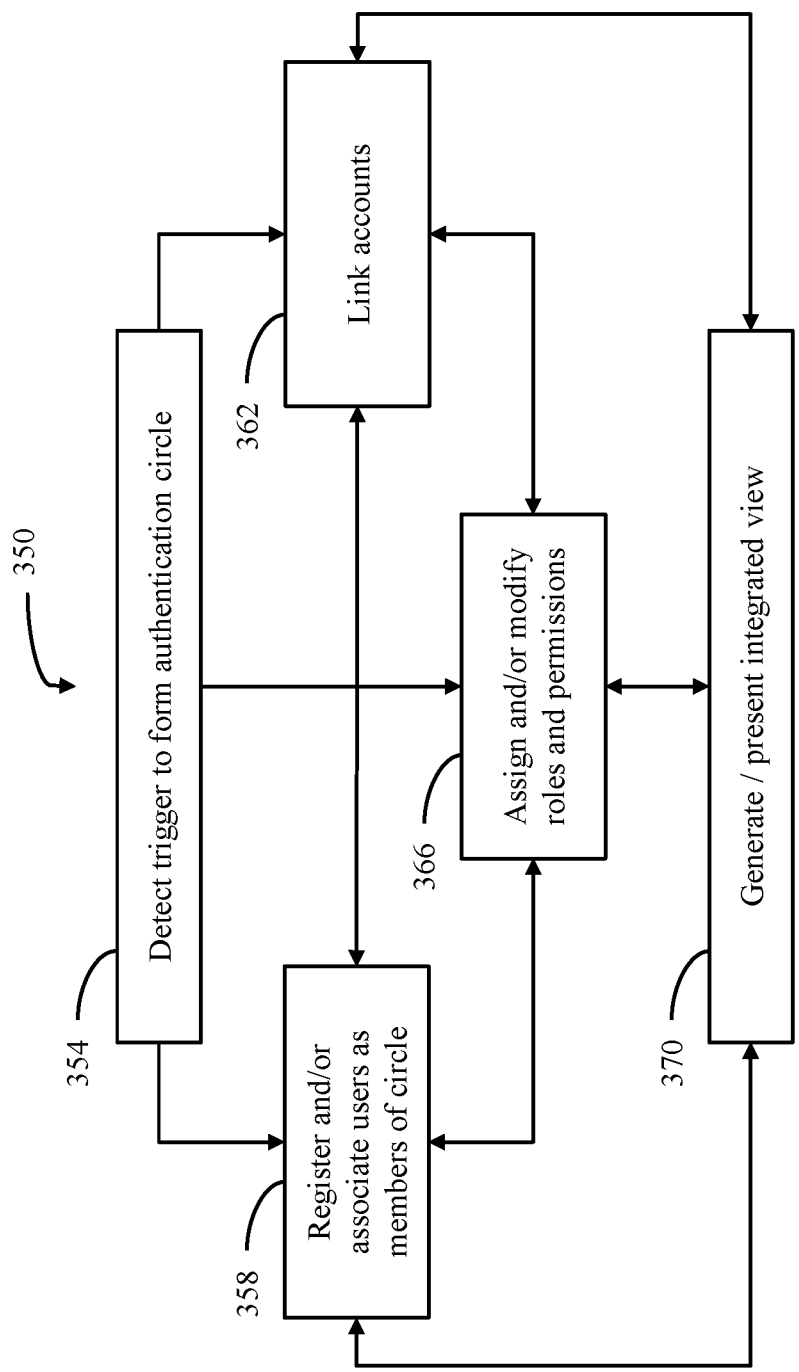
FIG. 3B is a flow diagram of an example method of managing an authentication circle, according to one or more example embodiments.

FIG. 3B provides a data flow 350 for providing an authentication circle according to example embodiments. At 354, a trigger to form an authentication circle is detected. In various implementations, the trigger may be an express trigger, such as a spoken request (e.g., "I would like an authentication circle") captured via ambient sensors 216 or a request submitted via a client application 230 or website of the service provider via user interfaces 206. In certain embodiments, the trigger may be inferred, such as by detection of an event detrimental to or otherwise affecting health or safety, such as a sound signature of a fall, and/or identification of a relevant issue in conversations among users (and/or conversations with a robo-advisor via user devices 106), such as a discussion of the event and/or relevant needs or desires.

At 358, users may be registered and/or associated with an authentication circle. This may include the users identifying a method of authentication (e.g., login credentials, biometric data, etc.) if the user does not already use a method of authentication to access accounts at the provider computing system 120. At 362, one or more accounts may be linked with the authentication circle. The accounts may be identified by the account owners, who may provide authorization and, as needed, credentials to be used by the provider computing system 120 to access the accounts (internally or externally via third-party computing systems 150). In some implementations, the provider computing system 120 may access external accounts via API calls to corresponding third-party computing systems 150. In certain implementations, the provider computing system 120 may receive security access tokens from the third-party computing systems 150 once the user has authorized access to accounts administered via the corresponding third-party computing systems 150. The security token may be transmitted to corresponding third-party computing systems 150 by provider computing system 120 to authenticate the provider computing system 120 and gain access to account data to be included into a dashboard of the circle.

At 366, roles and permissions may be assigned and/or modified for each member. In various embodiments, assignments and modifications to roles and permissions may be made by one or more members who are designated as circle administrators. Each circle administrator may be permitted by one or more members who are owners of linked accounts to grant or revoke access of other members to the linked accounts. Assignments and modifications of roles and permissions may alternatively or additionally be made by owners of linked accounts at least with respect to the linked accounts. Permissions may range, for example, from no access to view-only access to full access, as discussed.

At 370, an integrated view/dashboard may be generated. In various versions, the dashboard may be customized by the provider computing system 120 and/or by the application running on user devices 106 for each member depending on roles and permissions. For example, the integrated view may list all accounts that are linked, but may not provide account details (balances, transactions, etc.), or the dashboard may list all accounts and account details, but only provide certain members with the functionality of making payments and balance transfers or executing other transactions. The dashboard may also be modified as new members are added or removed (e.g., at 358), as accounts are linked and unlinked (e.g., at 362), as roles and permissions are assigned or modified (e.g., at 366), etc.

The arrows in FIG. 3B indicate that different steps may be performed in different sequences and performed multiple times after other steps are performed. In some implementations, an authentication circle may be established upon detection of the trigger (at 354). In certain embodiments, once a trigger is detected at 354, a circle may be formed and one or more users may be registered or otherwise associated with the circle (at 358). In certain versions, once a trigger is detected at 354, a circle may be formed and one or more accounts may be linked to the circle (at 362) if, for example, the circle is to be formed on behalf of a user who has authorized authentication circles on his or her behalf. In certain versions, once a trigger is detected at 354, a circle may be formed and one or more initial (and subsequently modifiable) roles or permissions may be assigned (at 366) if, for example, AI engine 138 has determined (or it has otherwise been determined) which user would be administering, assisting/assisted, managing, spectating, etc., in the circle (e.g., based on an analysis of conversations). In other implementations, the authentication circle may be established only after users are registered/associated as members (at 358), after one or more accounts are linked (at 362), and/or after roles and permissions of at least one potential members has been determined (at 366).

Figure 3C:
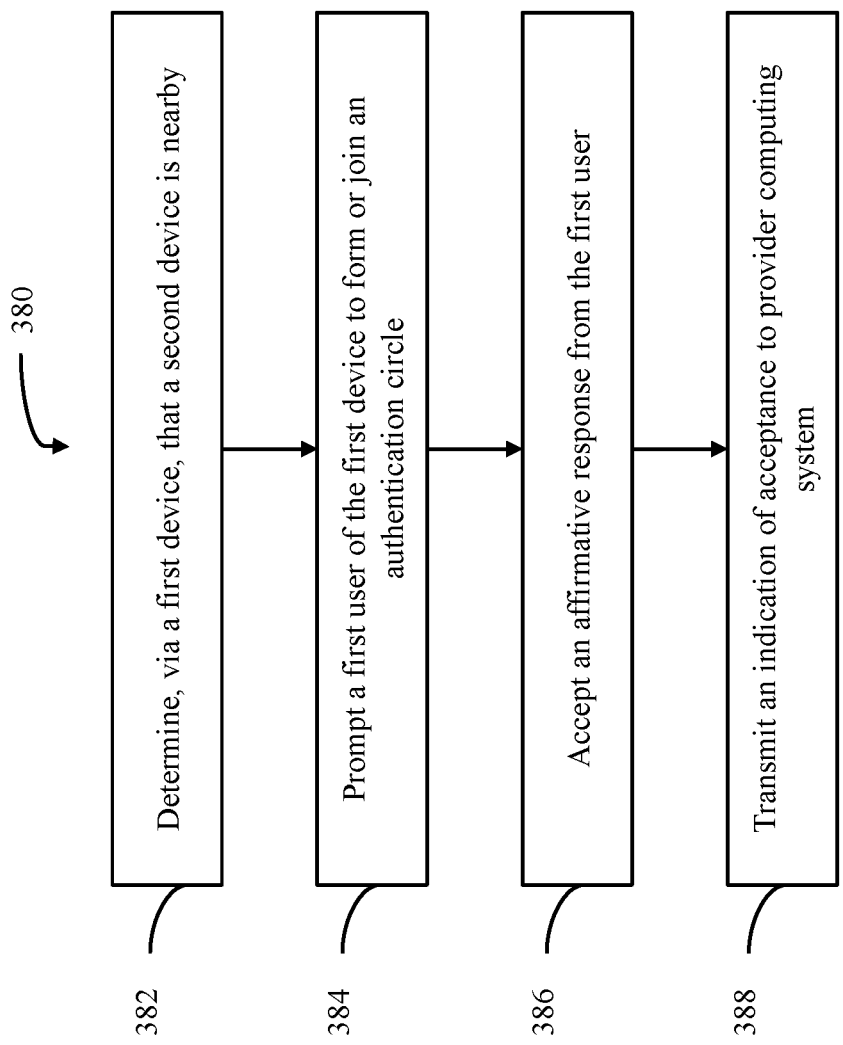
FIG. 3C is a flow diagram of an example method of forming an authentication circle, according to one or more example embodiments.

FIG. 3C provides a data flow 380 for forming an authentication circle according to example embodiments. At 382, a first device 106(1) (such as a smartphone, tablet computer, smart wearable device, etc.) may determine that a second device 106(2) (which may also be a smartphone, tablet computer, smart wearable device, etc.) is in its vicinity. In various implementations, the first device 106(1) may detect the second device 106(2) via, for example, direct communications with the second device 106(2) (e.g., via near-field communication (NFC) or Bluetooth) or communications with a third device (e.g., a Wi-Fi router with which both the first and second devices are in communication). In certain versions, the first device 106(1) may determine that the second device 106(2) is nearby via provider computing system 120. For example, the provider computing system 120 may receive location data (determined using location sensors 214) from the first and second devices 106(1), 106(2). If, based on a comparison of location data from the devices 106(1), 106(2), the provider computing system 120 determines the first and second devices 106(1), 106(2) are nearby (e.g., within 10 meters, or at the same establishment), the provider computing system 120 may transmit a notification to one or both of the first and second devices 106(1), 106(2) to inform them of their proximity or otherwise propose an authentication circle. In certain implementations, the provider computing system 120 may send the location of the second user device 106(2) to the first user device 106(1), and the first user device 106(1) may compare its location with the received location to determine that the second user device 106(2) is nearby. In various implementations, both the first and second users are customers of the provider and have granted the provider system 120 permission to determine their location using location sensors 214 (either generally or for the purpose of forming and administering authentication circles).

At 384, the first device 106(1) may prompt (e.g., via a notification presented on a display screen, via a sound or voice prompt, etc.) the first user to form or join an authentication circle with the second user. The identity of the second user may have been received from the second device 106(2) directly and/or from the provider system 120. At 386, the first device 106(1) may accept an affirmative response from the first user. The first user may provide the affirmative response via, for example, a selection on a touchscreen, voice command, or otherwise. In various implementations, the second device 106(2) may similarly prompt the second user regarding the authentication circle and similarly accept an affirmative response from the second user. At 386, the first device 106(1) may transmit an indication of acceptance to provider computing system 120. The second user may accept joining the authentication circle by transmitting an acceptance directly to the provider computing system 120 or indirectly via the first device 106(1). The provider computing system 120 may then form an authentication circle and associate the first and second users as members, or join the first and second users as members of an existing authentication circle.

Figure 4:
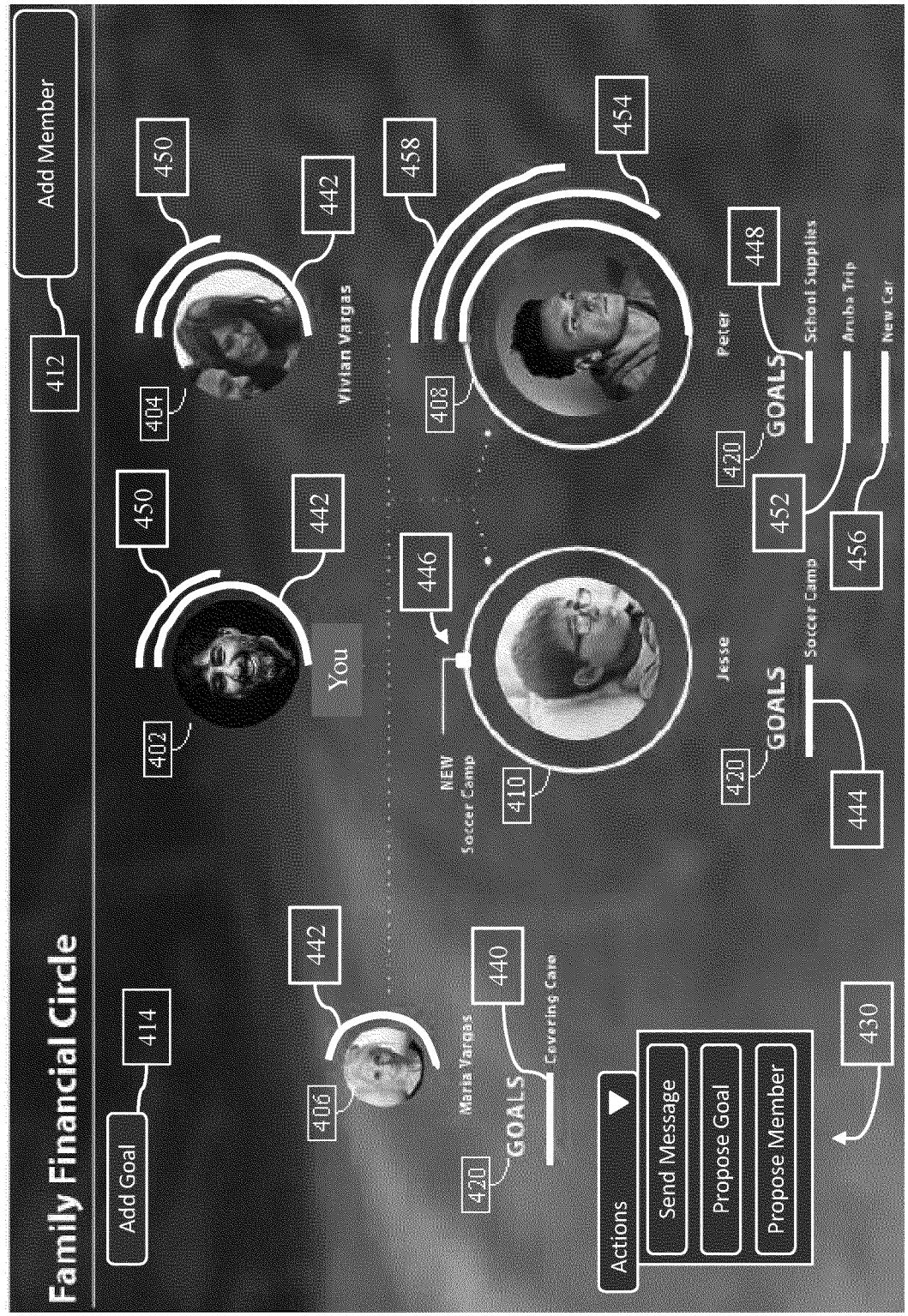
FIG. 4 depicts an example graphical user interface of a system providing an authentication circle, according to one or more example embodiments.

FIG. 4 depicts an example dashboard (e.g., a graphical user interface 400) from an example authentication circle titled "Family Financial Circle," according to one or more example embodiments. In FIG. 4, the circle includes members 402, 404, 406, 408, and 410. Because example interface 400 is what would be displayed when the father 402 logs in, the father 402 is labeled "You" and the other members are identified by name. The Family Financial Circle may have been formed to manage a financial account of another user, assist with meeting financial goals, etc. Users may be presented with the graphical user interface 400 via one or more user interfaces 206 of one or more user devices 106. A member with authorization (e.g., administrative rights) may select an activatable add-member link 412 (e.g., a button, icon, and/or image), activation of which is structured to indicate to the circle manager 128 an interest to add a user to the authentication circle. Selection of add-member link 412 can be detected by one or more user interfaces 206, which may generate a signal indicating that the link 412 has been selected and transmit the generated signal to an application 230 running on user device 106. The application may transmit a message to the circle manager 128 of provider computing system 120. The messaging module 130 may send or otherwise transmit a message structured to invite the identified user to join the circle and optionally set up one or more financial goals. A member may set up a financial goal via an activatable add-goal link 414 for one or more members of the authentication circle via, for example, goal manager 140.

In some examples, icons 402 and 404 may indicate or represent parents and/or members who manage accounts and/or administer the authentication circle, and icons 408 and 410 may indicate or represent children and/or members who may not manage accounts or administer the circle. One of the parents 402, 404 may set a financial goal for a child 408, 410 who is saving for an activity, such as soccer camp. In such examples, members, once authenticated, may access or otherwise see an integrated view of the combined finances of the members of the authentication circle. Different members (with different roles and responsibilities) may be provided with different views that reveal more or less information and/or that provide more or less functionality.

More specifically, the example circle represented in FIG. 4 includes as members a father 402, a mother 404, a grandparent 406, and children 408 and 410. In certain implementations, one or more members (402, 404, 406, 408, 410) do not have login credentials for accessing the authentication circle. Such members may be added to a circle so that, for example, goals can be entered on that member's behalf and the members can track the progress towards achieving the goal. This allows, for example, parents to identify persons who may not have computer access (such as a new baby) as part of a circle even if that member is not himself or herself tracking progress toward a goal (such as saving for college). This also allows a member to be added if, for example, a debt is owed to that individual, even though that person is not to have access to any of the information accessible via the circle. Such non-members may, in some implementations, be sent notifications (via, e.g., messaging module 130) regarding milestones. Notifications may be, for example, via text, e-mail, or announcement spoken by a user device 106 such as a smart speaker when, for example, the user's voice signature is detected and the user is thereby determined to be in the vicinity and able to receive (hear) the notification.

Interface 400 provides goals 420 placed near each corresponding member associated with the goal. For example, a goal of "Covering Care" has been identified for grandparent 406, the goals of "School Supplies," "Aruba Trip," and "New Car" have been identified for child 408, and a goal of "Soccer Camp" has been identified for child 410. A member may enter a goal for himself/herself, or for another member, such that the goal of "Soccer Camp" can be entered by, for example, member 410 ("Jesse") associated with the goal, or by another member such as parents 402, 404. If a member is designated as a spectator, or if the member does not have access to the authentication circle (even though a goal has been set up for that member) such that no changes or additions can be made by that member, the member may communicate a proposal to add a specified goal that could then be entered by an authorized member. Goals may be proposed via a user device 106 (such as a smart speaker in the home). In some implementations, dashboard 400 may provide a menu of selectable options 430 to allow members to, for example, click on a corresponding icon to select, for example, "Send Message," "Propose Goal," "Propose Member," etc., from a list found in a drop-down menu/window.

Each goal may be associated with a unique visual indicator (such as a color, pattern, image, etc.), such that lines or other icons with, for example, the associated color or pattern corresponds with the goal. Each goal may be associated with a legend icon and a status indicator. In interface 400, status lines (e.g., arcs) are shown around corresponding members to visually indicate the progress towards a goal, such that, for example, the length/size of the arc relative to a full circumference of the corresponding circle indicates percentage of the goal that has been attained. For example, the goal of "Covering Care" may be represented by a colored line as indicated by legend icon 440 and may be assigned to or otherwise associated with members 402, 404, and 406. Accordingly, members 402, 404, and 406 have colored arcs as status indicators 442 around their icons, with the size of the arcs (relative to a full circle) corresponding to progress. Here, the members are halfway to the goal, and the colored progress arc for this goal is thus a semicircle and is placed around members 402, 404, and 406. The goal "Soccer Camp," associated with legend icon 444, has been recently added (as indicated by the label "New" in FIG. 4) and the status indicator 446 for this goal is thus simply a stub (depicted as a small square) that indicates that little to no progress has been made towards the goal. The new goal is associated with member 410, and is thus placed around member 410. Similarly, the goal of "School Supplies," corresponding with legend icon 448, is associated with members 402, 404, and 408, and the approximately 25% progress towards achieving that goal is indicated by a colored quarter-circle as status indicator 450 positioned around members 402, 404, and 408. The goals of "Aruba Trip" and "New Car," corresponding to legend icons 452 and 456, are specific to member 408, and progress towards those goals is represented by corresponding arcs as status indicators 454 and 458, respectively, around only member 408.

Any of the icons or screen elements can be structured to be clickable or otherwise selectable (using any input mechanism, such as a touchscreen, mouse, voice prompt, gesture, etc.) for accessing additional information (such as details about an account, a goal, etc.), and/or for making authorized changes (such as updating progress or icons, adding or moving funds needed for an identified goal, expense, etc.). To access a linked account, an authorized member (such as a manager or participant) may select the account holder to view the linked accounts. For example, if member 402 is managing an account of member 406, member 402 may select the image of member 406 and select from a list (not shown) of linked accounts to view/manage.

Figure 5:
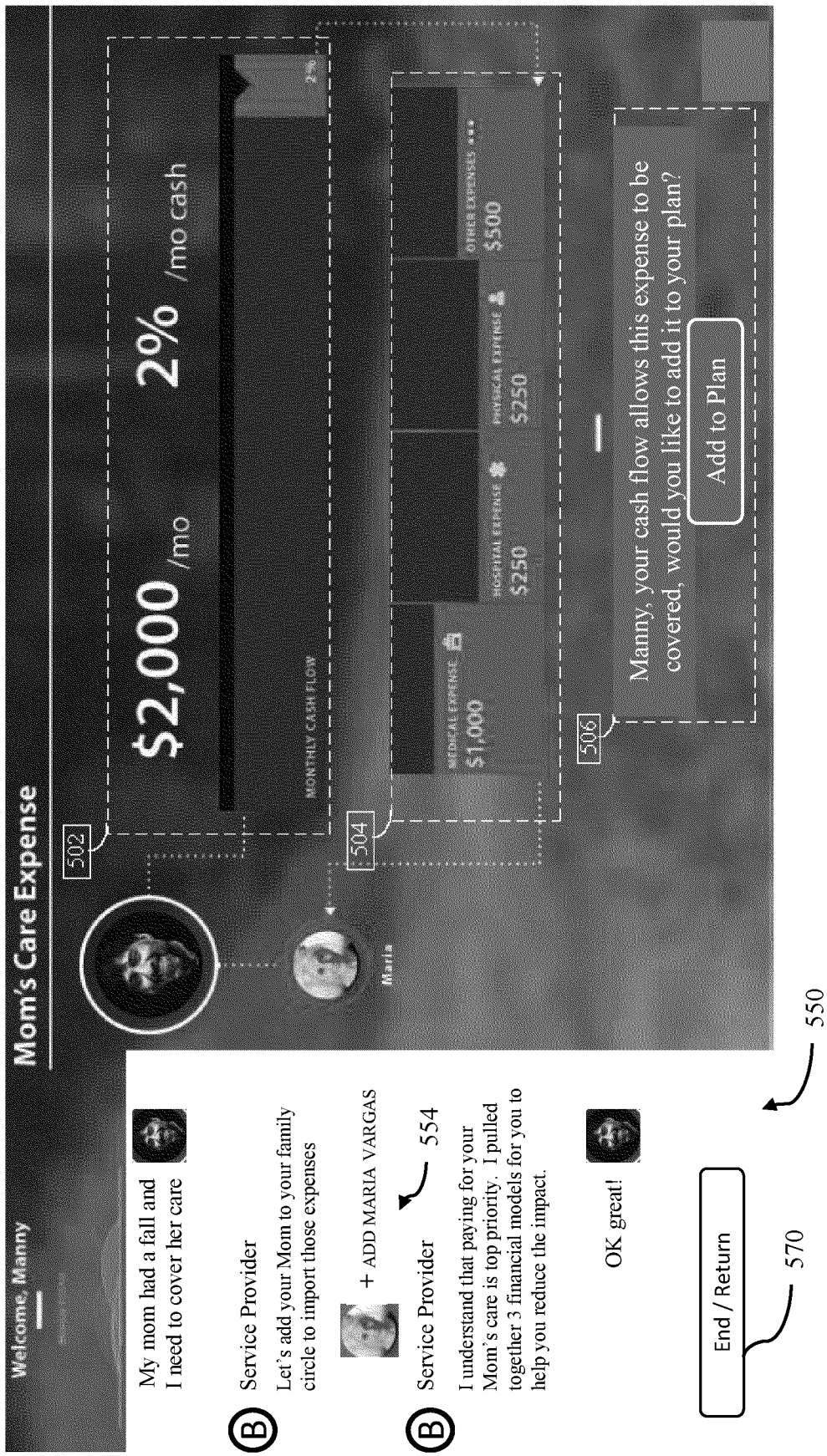
FIG. 5 depicts an example graphical user interface of a system providing an authentication circle, according to one or more example embodiments.

Illustrated in the graphical user interface 500 of FIG. 5 is an example provision of financial information and advice (e.g., via the AI engine 240 of application 230 running on user device 106 and/or the AI engine 138 of the provider computing system 120) to one or more members of the authentication circle according to a group (e.g., members associated with a goal, or members with certain roles, such as managers and participants), goal, or a combination thereof. The individual(s), groups, and/or goals may be displayed or otherwise indicated by a graph (e.g., graphs 502 and 504), chart, table, image, icon, etc. Advantageously, the graphical user interface 500 may present financial planning advice, assistance, and/or an assessment to the customer which reflects the financial needs, financial resources, or other like information of the customer and of, for example, the other member(s) of the authentication circle. The provision of financial advice to members of the authentication circle according to a group and/or goal advantageously takes into account the specific financial situations of the members of the authentication circle. For example, as shown at 506, the graphical user interface 500 may indicate that a user has cash flow that allows an expense (e.g., an expense to be paid, monitored, etc., on the behalf of another member of the authentication circle) to be added to the plan of that user. In turn, the graphical user interface 500 may receive an indication to add the expense in response to the user clicking a button, image, icon, etc. and/or providing a voice command structured to add the expense (via, e.g., a chat bot).

The interface 500 may also include additional details, such as the impact of a first member's funds on the expenses/goals/financial situation of the first member as well as on the expenses/goals/financial situation of one or more other members in the authentication circle. As with other interfaces, any of the icons or screen elements can be structured to be clickable or otherwise selectable (using any input mechanism, such as a touchscreen, mouse, voice prompt, gesture, etc.) for accessing additional information (such as details about a goal, an account, etc.) and/or for making authorized changes (such as identifying the account from which a contribution of funds is to be made).

In FIG. 5, member 402 ("Manny") is engaging with a service provider represented by the circled "B" via advising window 550 (on the left of interface 500). In various embodiments, this virtual conversation may be with a human advisor. The human advisor may be presented (by the provider computing system 120 and/or one or more third-party computing systems 150) with a similar dashboard to assist the advisor in more quickly gaining context and understanding the member's perspective. Additionally or alternatively, the virtual conversation may be with a robo-advisor implemented via AI engine 138, AI engine 240, and/or other components of provider computing system 120 and/or user device 106. In the advising session 550 depicted, member 402 may identify one or more issues (e.g., that his mother had a fall and he would like to cover her healthcare expenses) via one or more user interfaces 206 by, for example, typing or speaking. In some implementations, the issues may be identified by the human or robo-advisor and presented in an impromptu or scheduled advising session 550. The human or robo-advisor may propose that the mother ("Maria Vargas" in interface 500) be added to the authentication circle via graphical interface 554. The "plus" (+) icon to the right of an image (or other icon) representing the user to be added is presented via the dashboard. Selecting the plus icon may, in some implementations, have an effect analogous to selection of add-member link 412 and identification of Maria Vargas.

In various embodiments, a user may be included in an authentication circle to assist members in tracking resources, activities, goals, expenses, etc., but the user who is included need not necessarily be added as a member (with login credentials and the ability to access the dashboard of the circle). In some implementations, a non-member may be provided with credentials that provide access to a simplified dashboard that only provides limited information, such as the identities, relationships, and/or goals of members, without details about goal progress, accounts and balances, and/or transactions. In some implementations, a user may grant the provider computing system 120 with permission to access account data at one or more institutions for use in the authentication circle without becoming a member of the circle. In other implementations, a user (who may or may not choose to become a member) may choose not to link account data but instead may choose to only link expense data (e.g., invoices imported from, e.g., third-party computing systems 150 of healthcare service providers), account data (e.g., via a bookkeeping or billing account), or data about goals and activities (via, e.g., a social networking or gig economy account).

The human or robo-advisor of the service provider also indicates that potential models have been devised for meeting the goal of covering the mother's care. In various implementations, such models may, for example: identify accounts and/or revenue streams from which the mother's expenses could be covered or a goal may otherwise be achieved; propose a certain amount of funds be automatically set aside each period (e.g., week, month, quarter, etc.) to cover future expenses; project a timeline for covering expenses on, for example, installment payment plans; identify categories of expenses and/or specific expenses to be automatically paid; identify the impact of the goal of covering the mother's expenses on other goals, and allow for adjustment of priorities or allocations of incoming funds with respect to the goals; etc. The member may end an advising session and/or close the advising window 550 and return to the dashboard (e.g., close out the advising window) by selecting an activatable end/return icon 570.

Figure 6:
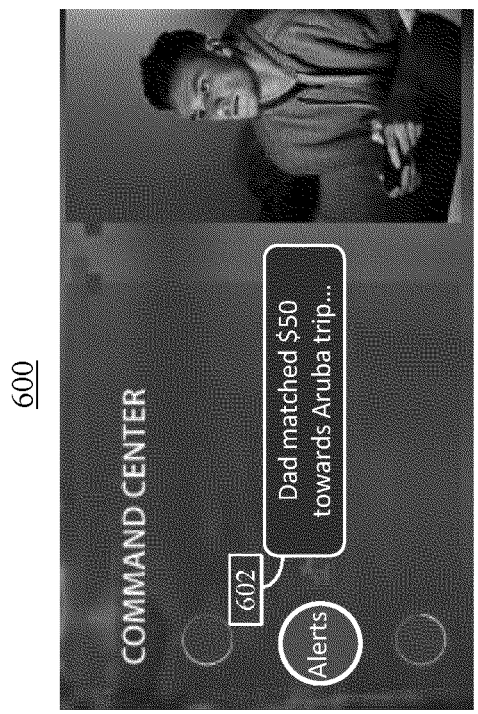
FIG. 6 depicts an example graphical user interface of a system providing an authentication circle, according to one or more example embodiments.

FIG. 6 depicts an example screen (e.g., a graphical user interface 600) corresponding with a dashboard (or a portion thereof) of an authentication circle according to example embodiments. The authentication circle notification (e.g., an alert 602) as depicted in the graphical user interface 600, may comprise a message (with, e.g., an amount indicative of a financial contribution). The graphical user interface 600 may be output, displayed, etc., by the user interfaces 206 of at least one user device 106 associated with one or more members. The messaging module 130 may be structured to provide authentication circle notifications identifying contributions or other events relevant to meeting a financial goal. The authentication circle notification may be provided to a user device 106 associated with a user who is not a member of the authentication circle and/or to one or more members of the authentication circle.

In some examples, user device 106 may determine an identity of a person associated with the authentication circle via a peer to peer network. For example, user device 106 may hear, learn, interpret, etc. a conversation of a customer, member, or other person stating that the mother of the customer has become ill. The provider computing system 120 may access (e.g., via an API) a peer to peer network (e.g., a social media network). For example, the provider computing system 120 may be communicatively coupled to the peer to peer network via the API such that the provider computing system 120 may determine the identity of the mother of the customer. In some examples, the provider computing system 120 may determine who the mother may be. For example, the provider computing system 120 may determine who the mother may be based on identifiers, attributes, and/or patterns (e.g., whenever the customer sends messages to a particular user, he refers to the user as "mom") included within communications of, for example, the son or any other member of the authentication circle. In other implementations, the provider computing system 120 may integrate or interface with third-party systems 150 and sources of information, such as social networking platforms (e.g., Facebook). This would allow the system to, for example, determine information on relationships between potential members of an authentication circle. The provider computing system 120 may then present (e.g., flash, display, etc.) profile pictures of the people suspected to be the mother via a graphical user interfaced displayed by a user device 106 of the son. The user device 106 may then ask, for example, "Is this your mother?" If the customer says "Yes," the provider computing system 120 may then identify the mother in its systems based on the information (e.g., a unique ID, email address, phone number, or other identifier) provided by the peer to peer network without, advantageously, the need for a user to provide account information.

The circle manager 128 may generate an authentication circle notification in real-time or near real-time such that the messaging module 130 may send alerts to the members of the authentication circle regarding other members of the authentication circle. In turn, the graphical user interface 600 or other interface of the circle may output the authentication circle notification in real-time or near real-time. The notification may be, in various implementations, push notifications, in-app notifications, text messages, audible alerts, etc. In some examples, the alerts may pertain to financial accounts not directly held by the member. For example, an adult child may establish a savings goal for a wedding. If the child is in the authentication circle of the parent when the adult child reaches the savings goal, the parent may be sent an alert, even though the account of the child is not tied to or otherwise associated with the parent. The alert contains information of interest to a member of the authentication circle and eliminates the need for the user to, for example, access an email client to receive notifications. The alerts may include content programmatically selected, generated, or recorded via an electronic process and initiated by an electronic system to notify a user associated with the user device 106 of an incoming message, notification, or the like that pertains to the authentication circle. The alert may be structured to activate (e.g., wake up) the user device 106.

In example interfaces, a member can see a contribution or infusion of funds (e.g., a bonus, paycheck, a deposit, maturation of a certificate of deposit (CD), etc.), and be allowed to choose how to apply those funds to goals, accounts, and/or causes (e.g., charities). In some implementations, a message may be generated by the system or transmitted by an advisor or agent of a financial institution (e.g., "Congratulations on your bonus, would you like to allocate the funds as you did last year, or choose new allocations?"). The system may indicate how funds were previously allocated, for example, for making progress towards goals identified for members of an authentication circle (e.g., "$750 contributed to Goal 1 last year" and "$450 contributed to Goal 2 last year"). For example, the system may show one or more goals, which, if the goals have been assigned a priority, may be shown in order of priority. Alternatively, a certain number (say, three, five, or another number specified by the member) of the highest priority goals may be shown if relative priorities have been designated. The system may then indicate, for example, the impact on progress towards each goal if the funds were divided equally among all of the goals, or among the highest priority goals. Alternatively, the system may indicate the impact based on prior allocations. The member may be allowed levers, bars, dials, up-down arrows, text boxes, or other icons or mechanisms that allow the member to modify the percentages (from zero to one hundred percent) of the funds that are contributed towards each goal. Once a desired ratio is selected, the member may press an icon (such as a button stating "Accept" or "Apply") to contribute the funds according to the displayed percentages, or another button (such as "Cancel" or "Save for Later") to discard or otherwise not apply the funds to the goals as shown. The provider computing system 120 may generate one or more proposals or recommendations (e.g., for how to allocate funds) based on, for example, priorities, available funding, response to inquiries, deadlines, voice commands, conversations involving one or more members of the authentication circle (extracted from, e.g., ambient sounds captured using one or more user devices 106 that may be pervasively listening), etc.

Figure 7:
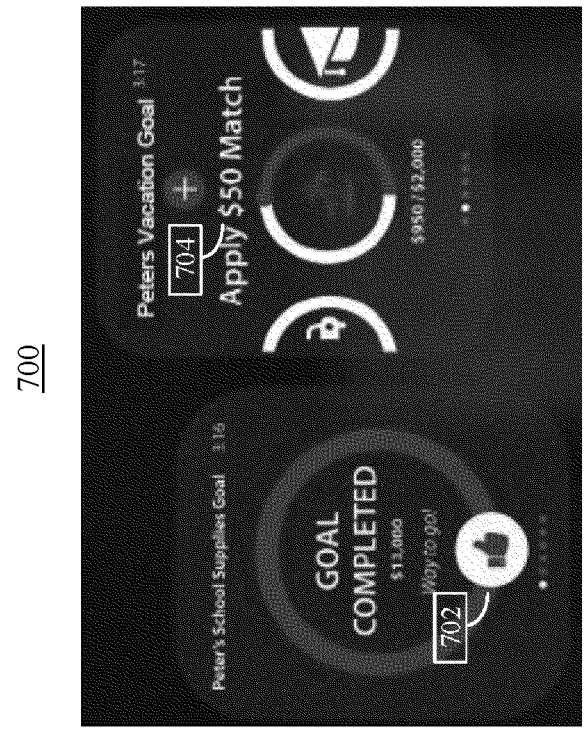
FIG. 7 depicts an example graphical user interface of a system providing an authentication circle, according to one or more example embodiments.

FIG. 7 depicts an example screen (e.g., a graphical user interface 700) corresponding with a dashboard (or a portion thereof) of an authentication circle according to example embodiments. As illustrated at 702, members of the authentication circle may provide an indication of interest 702 (e.g., a member may "like" the notification, reply to the notification, reply to the notification via a re-post, reply to the notification with a message (e.g., "Thank you!"), contribute to the financial goal, etc.) structured to demonstrate interest of the member in the notification. The indication of interest may be received in response to a click, tap, swipe, voice command, etc., provided by the user via the graphical user interface 700. In turn, the messaging module 130 may receive, via one or more user interfaces 206 of the user device 106, the indication of interest such that the user device 106 may display or output the indication of interest as illustrated at 702 in FIG. 7.

With reference back to FIG. 3, alternatively or additionally, the authentication circle notification may be structured to prompt a member of the group to pay at least a portion of the financial goal (e.g., to pay at least a portion of a bill, expense, debt, etc.). For example, the financial needs of a customer and their mother may be interrelated to the extent that medical expenses that the mother cannot cover may instead be covered by the customer or other member of the authentication circle. Accordingly, the messaging module 130 may generate an authentication circle notification structured to prompt a member (e.g., the customer) of the authentication circle to pay at least a portion of the medical expenses of the mother or for another goal/expense (e.g., at 704).

The messaging module 130 may generate an authentication circle notification to prompt members about splitting (i.e., sharing responsibility for) an expense in appropriate circumstances. In some examples, the authentication circle notification may be structured to prompt a plurality of members of the authentication circle to split expenses. For example, the siblings of the customer may also be included in the authentication circle along with the customer and the mother of the customer. The authentication circle notification may prompt the siblings to pay at least a portion of the expenses on behalf of the mother of the group. The provider computing system 120 may be further structured to calculate the portion of the expenses owed by one or more members of the authentication circle. The transaction monitor 136 may receive or otherwise retrieve the financial contribution owed by each member.

In turn, the messaging module 130 may generate the circle notification comprising the financial contribution calculated to prompt a member of the authentication circle to pay a portion of the expense owed. To that end, the authentication circle notification may specify the portion of the expense owed and request approval to make the funds transfer between one or more user accounts.

The provider computing system 120 (via user devices 106) may receive a financial contribution such as, but not limited to, a portion of an expense owed, or other financial assistance. Receipt of the financial contribution by the authentication circle increases the progress of the authentication circle towards meeting and/or exceeding a financial goal of the authentication circle. Accordingly, the transaction engine 146 may be further structured to cause a funds transfer comprising at least a financial contribution between one or more user accounts, third party accounts, or a combination thereof associated with the authentication circle. For example, the transaction engine 146 may cause funds to be transferred from a financial account of the child to the financial account of the mother to assist in meeting the goal of the authentication circle and/or to contribute to an expense incurred by or on behalf of a member of the authentication circle.

Figure 8:
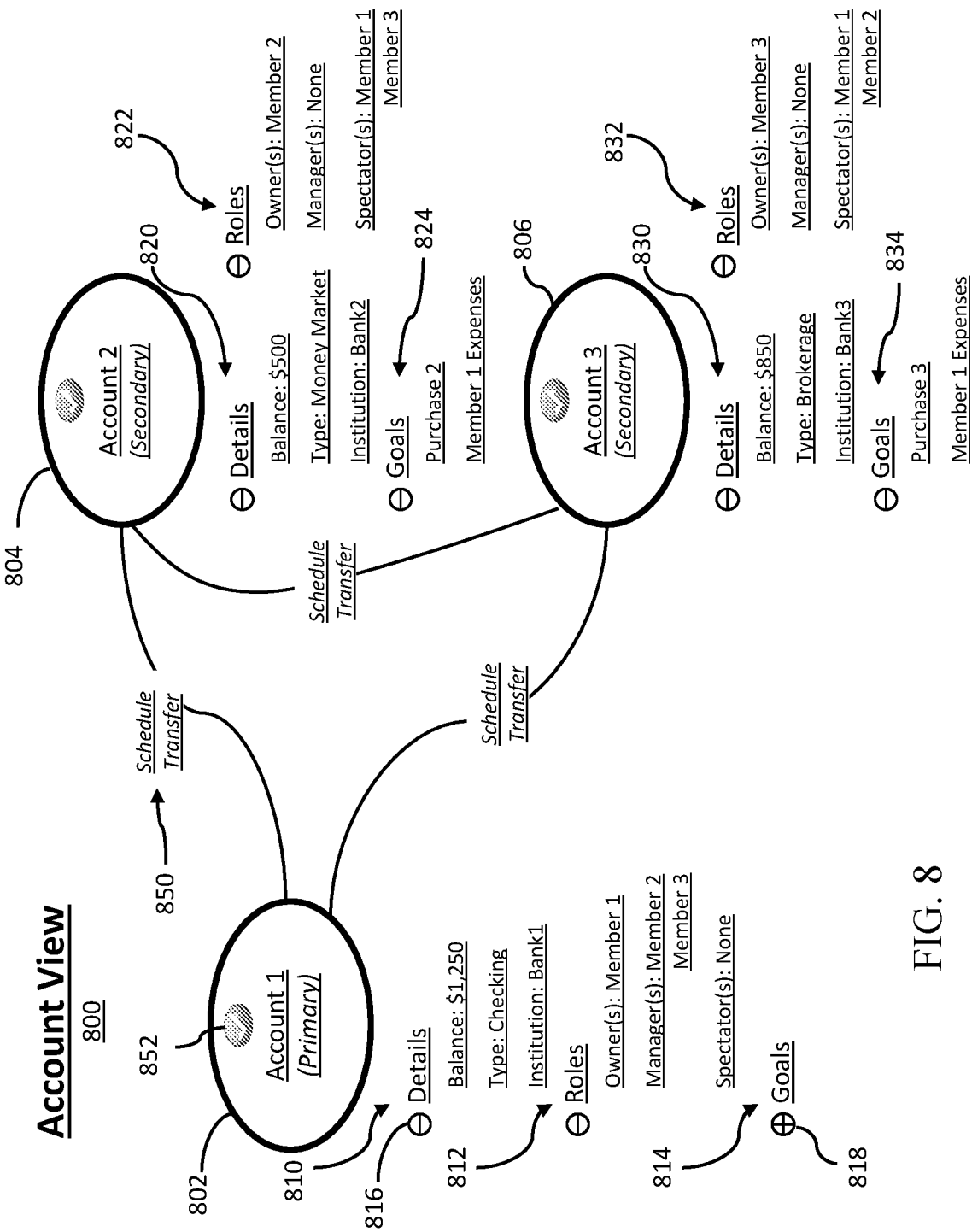
FIG. 8 provides an example integrated view of an authentication circle, according to one or more example embodiments.
Figure 9:
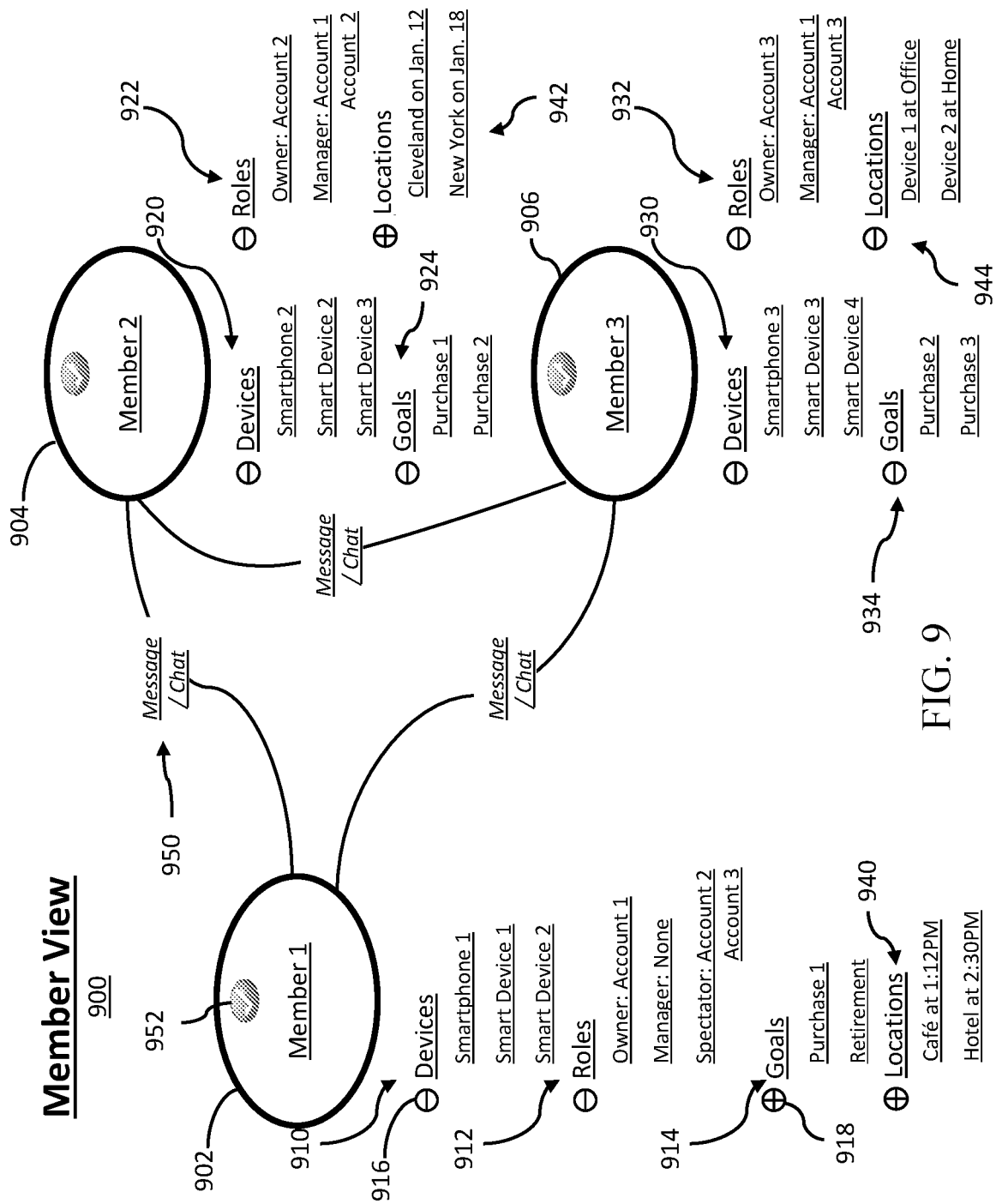
FIG. 9 provides an example integrated view of an authentication circle, according to one or more example embodiments.

In various embodiments, an application 230 running on a device 106 of a member may present various interactive graphical user interfaces, such as the interfaces of FIGS. 8 and 9. In FIGS. 8 and 9, display elements/icons may be activatable/selectable by a user to allow the user to navigate among screens/user interfaces, retrieve additional information, provide additional inputs, and/or to make changes.

In FIG. 8, an "Account View" 800 may present members with information on accounts that are linked to an authentication circle. Display icons 802, 804, and 806, corresponding with accounts 1, 2, and 3, respectively, may identify the three accounts and indicate a type of account in relation to the authentication circle. For example, account 1 is identified as being a "primary" account because it is managed by (or otherwise accessible to beyond view-only access) one or more members who are not account owners, and accounts 2 and 3 are identified as being "secondary" accounts because they are available for viewing and/or for funds transfers, but remain under the control of the account owner. Selecting "Account X" or "Primary"/"Secondary" may allow an authorized member to make changes, such as to the nickname of the account or to its designation (as, e.g., primary or secondary), how it is managed, and/or whether it is linked.

In the example user interface 800, various information is provided for each account, such as information on details, roles, and/or goals (financial or otherwise). Account 1 corresponds with details 810, roles 812, and goals 814, account 2 corresponds with details 820, roles 822, and goals 824, and account 3 corresponds with details 830, roles 832, and goals 834. Details may include account balance, type of account, and the institution at which the account is held. Selecting the "details" icon or the icons for the items under "details" may, for example, allow an authorized member to receive additional information on the corresponding account. Roles may identify which member(s) are owners, managers (e.g., members who have more than view-only access), and/or spectators (e.g., members who have view-only access). Selecting the "roles" icon or the icons for the items under "roles" may, for example, allow authorized members to receive additional information and/or to modify roles. Goals may identify which goals are supported/funded by the corresponding accounts. Selecting the "goals" or the icons for the items under "goals" may, for example, allow authorized members to receive additional information and/or to modify the goals or the association of the goals with the corresponding account. To hide the list of items under a section, a collapse icon 816 may be selected, and to expand the list of items under a section, an expand icon 818 may be selected.

By selecting the "schedule transfer" icon 850, a member may, for example, arrange for funds to be transferred between linked accounts and/or for payments to be made (via transaction engine 146) to, for example, split an expense. The active/live icon 852 may indicate, for example, that an account is currently linked and accessible, and/or that the information listed under the corresponding account is up-to-date (e.g., was updated since last login by the member, or was updated in the past minute, hour, day, or other timeframe).

In FIG. 9, a "Member View" 900 may present members with information on members of an authentication circle. Display icons 902, 904, and 906, corresponding with members 1, 2, and 3, respectively, may identify the three members of the authentication circle. Selecting "Member X" may allow an authorized member to make changes, such as to the designation and/or photograph of the member, to what information may be accessed by the member, and/or to whether the member is to be removed from the authentication circle.

In the example user interface 900, various information is provided for each member, such as information on devices, roles, goals, and/or locations. Member 1 corresponds with device 910, roles 912, goals 914, and locations 940, member 2 corresponds with devices 920, roles 922, goals 924, and locations 942, and member 3 corresponds with devices 930, roles 932, goals 934, and locations 944. In certain embodiments, the devices sections 910, 920, 930 may identify, for example, user devices 106 from which the authentication circle has been accessed by the corresponding member, and/or user devices 106 which have detected the corresponding member in its vicinity (via, e.g., detection of a voice signature or facial recognition). In various embodiments, the devices sections 910, 920, 930 may identify which devices pervasively (e.g., on an ongoing basis) or intermittently (e.g., at specified times) "listen" to or "watch" their surroundings. For example, a user device 106 may "listen" by detecting ambient sounds or "watch" by capturing imagery, and analyzing the captured sounds and/or images (or having them analyzed) for voices and/or faces of members and/or to identify circumstances (such as falls) and/or desires/needs of members. In certain implementations, the identified devices may include user devices 106, the locations of which are determined (using, e.g., location sensors 214 such as global positioning system sensors) to determine goals, expenses, or other information (e.g., by pinging a location sensor 214 of the user device 106 regularly or following certain triggers, such as detection of a purchase by another member of the authentication circle). The identified devices may alternatively or additionally be used for messaging/chatting with other members of the authentication circle. Selecting the "devices" icon or the icons for the items under "devices" may, for example, allow an authorized member to receive additional information on the device or how or when it is used, and/or to make changes, such as dissociating or removing the device from the authentication circle or the member.

Roles sections 912, 922, 932 may identify the roles played by the corresponding member (e.g., whether the member is an owner, manager, and/or spectator of accounts linked to the authentication circle). Selecting the "roles" icon or the icons for the items under "roles" may, for example, allow authorized members to receive additional information and/or to modify roles. Goals sections 914, 924, 934 may identify goals of a member, and/or goals associated with the member as goals that are supported/funded by the corresponding member. Selecting the "goals" icons or the icons for the items under "goals" may, for example, allow authorized members to receive additional information and/or to modify the goals or the association of the goals with the corresponding member. To hide the list of items under a section, a collapse icon 916 may be selected, and to expand the list of items under a section, an expand icon 918 may be selected.

Locations sections 940, 942, 944 may identify the past, current, and/or future (anticipated) locations for members. In various versions, locations sections 940, 942, 944 may list the devices of corresponding members, and the last known location of the corresponding device, and/or places and corresponding dates/times for when the member was detected or reported to be at the corresponding places. Locations may be, for example, the last location detected using location sensors 214, locations determined based on transactions involving user devices 106, locations identified based on flight or hotel reservations, locations self-identified by the corresponding member, and/or locations as reported by one or more other members. Selecting the "locations" icons or the icons (devices, places) for the items under "locations" may, for example, allow authorized members to receive additional information regarding how the location was determined, what transactions occurred at which locations, location history for devices or members, when a location was detected or identified, etc. Locations may be relevant to show, for example, how expenses are to be shared (e.g., who was at a social gathering and may be asked to contribute to the costs of the gathering), how goals are achieved (e.g., if a goal requires one or more members to travel to a destination), and whether certain tasks can be accomplished (e.g., whether members are close enough to able to meet at a certain place and time). In some implementations, the locations feature may be deactivated for some or all members to maintain privacy, or may be unavailable due to, for example, a lack of a device with a location sensor. In certain implementations, location tracking (e.g., which members have their locations tracked and/or when and how) may be defined in permission definitions set by one or more members.

By selecting the "message/chat" icon 950, a member may, for example, send a message to another member and/or initiate a chat (e.g., text, audio, or video) with another member. The active/live icon 952 may indicate, for example, that a member is currently logged into the authentication circle, or has recently logged in (e.g., within the past hour, day, week, or other window of time), and/or that the information listed under the corresponding member is up-to-date (e.g., was updated since last login by the member, or was updated in the past minute, hour, day, or other timeframe).

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An example system for implementing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A method implemented by a service provider computing system having one or more processors, the method comprising:

receiving, by the one or more processors, from at least one of a first device of a first user or a second device of a second user, sounds captured using at least one of a first audio sensor of the first device or a second audio sensor of the second device, respectively, wherein at least one of the first device or the second device is a digital voice assistant, the sounds indicating that the first user and the second user are participating in a telephone conversation;

analyzing, by a digital signal processor of the one or more processors, the captured sounds to detect a sound signature corresponding to an adverse health event of the first user or the second user to generate an authentication circle that includes the first user and the second user as members, the sound signature detected by detecting an unexpected silence during the telephone conversation while the first user or the second user is speaking, wherein the authentication circle is proposed for assistance of the first user or the second user experiencing the adverse health event;

determining, by the one or more processors, that the first device is near the second device based on direct radio-frequency communication between the first device and the second device;

transmitting, by the one or more processors, responsive to determining that the first device is near the second device, a first notification to the first device and a second notification to the second device to propose the authentication circle to the first user and the second user, respectively;

presenting, by the one or more processors, via a network, an authentication dashboard accessible to the first and second devices via the network;

accepting, by the one or more processors, from the first device, a first login credential entered by the first user via a login screen of the authentication dashboard accessed using the first device;

registering, by the one or more processors, the first user for the authentication circle such that the first login credential authenticates the first user for access, via the network, to the authentication circle via the authentication dashboard;

accepting, by the one or more processors, from the second device, a second login credential entered by the second user via the login screen of the authentication dashboard accessed using the second device;

registering, by the one or more processors, the second user for the authentication circle such that the second login credential authenticates the second user for access, via the network, to the authentication circle via the authentication dashboard;

determining, by the one or more processors, that a first account of the registered first user is to be linked to the authentication circle, the determination indicating that only a subset of first account data of the first account of the first user is to be linked to the authentication circle;

linking, by the one or more processors, the first account to the authentication circle such that only the subset of the first account data of the first account is retrievable via the authentication dashboard using the first login credential of the first user or the second login credential of the second user, such that the subset of the first account data is assigned to the first login credential of the first user or the second login credential of the second user;

accepting, by the one or more processors, via the authentication dashboard accessed on the second device via the network, the second login credential;

transmitting, by the one or more processors via the network, the subset of the first account data to the second device in response to accepting the second login credential at the authentication dashboard, wherein prior to being linked to the authentication circle, the first account was not accessible via the second login credential;

receiving, by the one or more processors, from the second device, a request to modify the subset of the first account data; and modifying, by the one or more processors, the subset of the first account data based on the request.

2. The method of claim 1, further comprising:

linking, by the one or more processors, a second account of the registered second user to the authentication circle such that second account data from the second account is retrievable for the authentication circle via the authentication dashboard;

accepting, by the one or more processors, via the second device, a second permission definition defining a subset of the second account data that is accessible via the authentication dashboard via the second login credential; and granting, by the one or more processors, according to the second permission definition, the registered first user access to the subset of the second account data in response to accepting the first login credential at the authentication dashboard, wherein prior to being linked to the authentication circle, the second account was not accessible via the first login credential of the registered first user.

3. The method of claim 2, further comprising:

registering, by the one or more processors, a third user for the authentication circle such that the third user is granted access to the authentication circle via the authentication dashboard via a third login credential; and granting, by the one or more processors via the authentication dashboard, in response to accepting the third login credential, the third user access to the subsets of the first and second accounts according to a first permission definition and the second permission definition, respectively.

4. The method of claim 1, wherein linking the first account to the authentication dashboard comprises acquiring, by the one or more processors, an access token from a third-party computing system, the access token being configured to grant the service provider computing system access to the first account.

5. The method of claim 1, wherein a first permission definition of the authentication circle further indicates that the registered second user may make changes to the first account.

6. The method of claim 1, further comprising receiving, by the one or more processors, from a third-party computing system administering the linked first account, an access token defining authorized activities for the linked first account.

7. The method of claim 1, further comprising:

determining, by the one or more processors, responsive to identifying a transaction involving the first account, a current location of the second device via a global positioning system sensor of the second device;

identifying, by the one or more processors, an association between the current location of the second device and a location of the transaction involving the first account; and transmitting, by the one or more processors, to the second device, responsive to identifying the association, a request for the second user to pay for at least a portion of the transaction.

8. The method of claim 1, wherein analyzing the captured sounds to detect the trigger comprises applying, by the one or more processors, natural language processing (NLP) to voices detect a verbal trigger to generate the authentication circle.

9. A service provider computing system comprising:
a network interface configured to communicate, via a telecommunications network, with a plurality of devices; and
one or more processors and memory storing instructions that, when executed by the one or more processors, cause the one or more processors to:
receive, from at least one of a first device of a first user or a second device of a second user, sounds captured using at least one of a first audio sensor of the first device or a second audio sensor of the second device, respectively, wherein at least one of the first device or the second device is a digital voice assistant, the sounds indicating that the first user and the second user are participating in a telephone conversation;
analyze, using a digital signal processor of the one or more processors, the captured sounds to detect a trigger to identify a sound signature corresponding to an adverse health event of the first user or the second user to detect a trigger to generate an authentication circle that includes the first user and the second user as members, the sound signature detected by detecting an unexpected silence during the telephone conversation while the first user or the second user is speaking, wherein the authentication circle is proposed for assistance of the first user or the second user experiencing the adverse health event;
transmit, responsive to detecting the trigger, a first notification to the first device and a second notification to the second device to propose the authentication circle to the first user and the second user, respectively;
present, via a network, an authentication dashboard accessible to the first and second devices via the network;
accept, from the first device, a first login credential entered by the first user via a login screen of through the authentication dashboard accessed using the first device;
register the first user for the authentication circle such that the first login credential authenticates the first user for access, via the network, to the authentication circle via the authentication dashboard;
accept, from a second input device of the second device, a second login credential entered by the second user via the login screen of the authentication dashboard accessed using the second device;
register the second user for the authentication circle such that the second login credential authenticates the second user for access, via the network, to the authentication circle via the authentication dashboard;
determine that a first account of the registered first user is to be linked to the authentication circle, the determination indicating that only a subset of first account data of the first account of the first user is to be linked to the authentication circle;
link the first account to the authentication circle, wherein linking the first account comprises obtaining access to the first account such that the subset of the first account data of the first account is retrievable via the authentication dashboard using the second login credential of the second user;
accept, via the authentication dashboard accessed on the second device, the second login credential;
transmit, via the network, the subset of the first account data to the second device for presentation in the authentication dashboard in response to accepting the second login credential at the authentication dashboard, wherein prior to being linked to the authentication circle, the first account was not accessible to the second user using the second login credential at the authentication dashboard;
determine, responsive to identifying a transaction involving the first account, a current location of the second device via a global positioning system sensor of the second device;
identify an association between the current location of the second device and a location of the transaction involving the first account;
transmit, to the second device, responsive to identifying the association, a request for the second user to pay for at least a portion of the transaction;
receive, from the second device, a request to modify the subset of the first account data; and
modify the subset of the first account data based on the request.

10. The system of claim 9, wherein the instructions, when executed by the one or more processors, further cause the one or more processors to obtain access to the linked first account at least by receiving a third login credential that grants direct access to the linked first account outside of the authentication circle.

11. The system of claim 9, wherein the first account is administered by the service provider computing system, and wherein the instructions, when executed by the one or more processors, further cause the one or more processors to link the first account to the authentication dashboard at least by authenticating the registered first user and obtaining authorization from the registered first user to access first account data for the authentication dashboard.

12. The system of claim 9, wherein the linked first account is administered by a third-party computing system, and wherein the instructions, when executed by the one or more processors, further cause the one or more processors to link the linked first account to the authentication circle at least by obtaining a security token from the third-party computing system, the security token being configured to authenticate the service provider computing system when the service provider computing system accesses the first account data.

13. The system of claim 9, wherein the linked first account is administered by a third-party computing system, and wherein the instructions, when executed by the one or more processors, further cause the one or more processors to retrieve the first account data at least by making an application programming interface (API) call to the third-party computing system.

14. The system of claim 13, wherein the instructions, when executed by the one or more processors, further cause the one or more processors to include a security token with the API call to the third-party computing system, the security token being configured to authenticate the service provider computing system and identify the linked first account.

15. The system of claim 9, wherein the instructions, when executed by the one or more processors, further cause the one or more processors to receive, via the authentication dashboard, an access token defining authorized activities for the linked first account.

16. The system of claim 9, wherein detecting the trigger comprises applying natural language processing (NLP) to the captured sounds to detect the trigger to generate the authentication circle that includes the first user and the second user as members.

17. A first device comprising: one or more network interfaces configured to communicate with one or more other devices;
- one or more user interfaces configured to receive inputs from a first user of the first device and provide outputs to the first user; and
- one or more processors and a memory storing instructions that, when executed by the one or more processors, cause the one or more processors to:
- receive sounds captured using a first audio sensor of the first device, the sounds indicating that the first user and a second user of a second device are participating in a telephone conversation;
- analyze, using a digital signal processor of the one or more processors, the captured sounds to detect a sound signature corresponding to an adverse health event of the first user or the second user to generate an authentication circle that includes the first user and the second user as members, the sound signature detected by detecting an unexpected silence during the telephone conversation while the first user or the second user is speaking, wherein the authentication circle is proposed for assistance of the first user or the second user experiencing the adverse health event;
- determine, via the one or more network interfaces, that that the first device is near a second device of the second user based on direct radio-frequency communication between the first device and the second device;
- prompt, via the one or more user interfaces, responsive to determining that the first device is near the second device, the first user to request the second user to be a second member of the authentication circle that includes the first user as a first member;
- accept, via the one or more user interfaces, an affirmative response to the request;
- transmit, via the one or more network interfaces, an indication of the affirmative response to a service provider computing system that administers the authentication circle;
- determine that a first account of the registered first user is to be linked to the authentication circle, the determination indicating that only a subset of first account data of the first account is to be linked to the authentication circle;
- link, via the one or more user interfaces, the first account to the authentication circle such that only the subset of the first account data is retrievable via the authentication dashboard using a login credential of the second user, such that the subset of the first account data is assigned to the login credential of the second user;
- transmit, via the one or more network interfaces to the service provider computing system, first account data corresponding to the linked first account;
- transmit, via the one or more network interfaces to the service provider computing system, a first permission definition defining a subset of the first account data that is accessible via the login credential;
- receive, from the second device, a request to modify the subset of the first account data; and
- modify the subset of the first account data based on the request.

18. The first device of claim 17, wherein the instructions, when executed by the one or more processors, further cause the one or more processors to determine that the second device is nearby via near-field communication between the first device and the second device.

* * * * *